US009090248B2

(12) United States Patent
Kato et al.

(10) Patent No.: US 9,090,248 B2
(45) Date of Patent: Jul. 28, 2015

(54) CONTROL SYSTEM, CONTROL DEVICE, AND CONTROL METHOD FOR HYBRID VEHICLE

(71) Applicants: Shunya Kato, Seto (JP); Tooru Matsubara, Toyota (JP); Akihiro Kimura, Toyota (JP); Masaya Yamamoto, Kasugai (JP); Hideki Furuta, Anjo (JP); Daisuke Suyama, Toyota (JP); Yuma Mori, Nukata-gun (JP)

(72) Inventors: Shunya Kato, Seto (JP); Tooru Matsubara, Toyota (JP); Akihiro Kimura, Toyota (JP); Masaya Yamamoto, Kasugai (JP); Hideki Furuta, Anjo (JP); Daisuke Suyama, Toyota (JP); Yuma Mori, Nukata-gun (JP)

(73) Assignees: TOYOTA JIDOSHA KABUSHIKI KAISHA, Toyota-shi (JP); AISIN AW CO., LTD., Anjo-shi (JP)

( * ) Notice: Subject to any disclaimer, the term of this patent is extended or adjusted under 35 U.S.C. 154(b) by 0 days.

(21) Appl. No.: 14/222,283

(22) Filed: Mar. 21, 2014

(65) Prior Publication Data

US 2014/0287869 A1    Sep. 25, 2014

(30) Foreign Application Priority Data

Mar. 22, 2013   (JP) .................................. 2013-060297

(51) Int. Cl.
*B60W 10/02*        (2006.01)
*B60W 10/105*       (2012.01)
(Continued)

(52) U.S. Cl.
CPC ............. *B60W 10/105* (2013.01); *B60K 6/445* (2013.01); *B60K 6/547* (2013.01); *B60W 10/08* (2013.01); *B60W 10/115* (2013.01); *B60W 20/00* (2013.01); *B60W 30/19* (2013.01); *B60K 2741/02* (2013.01); *B60W 10/02* (2013.01); (Continued)

(58) Field of Classification Search
CPC ... Y10T 477/26; Y10T 477/75; Y10T 477/78; B60W 10/02; B60W 2510/083; B60K 2741/02; B60K 6/445
USPC ............................................. 477/5, 174, 180
See application file for complete search history.

(56) References Cited

U.S. PATENT DOCUMENTS

2005/0245350 A1* 11/2005 Tabata et al. .................... 477/34
2007/0155584 A1*  7/2007 Tabata et al. .................... 477/70
(Continued)

FOREIGN PATENT DOCUMENTS

JP     2007-002899     1/2007
JP     2007-118724     5/2007
JP     2010-36705      2/2010

*Primary Examiner* — Roger Pang
(74) *Attorney, Agent, or Firm* — Oblon, McClelland, Maier & Neustadt, L.L.P.

(57) ABSTRACT

A hybrid vehicle includes an electric steplessly speed changing unit, an engaging device, and an electronic control unit. The electric steplessly speed changing unit includes a differential mechanism including a first rotary element to which an engine is coupled, a second rotary element to which a first rotary machine is coupled, and a third rotary element as an output rotary member of the differential mechanism to which a second rotary machine is coupled. Differential operation of the electric steplessly speed changing unit is controlled by controlling operation of the first rotary machine. The engaging device is provided in a power transmission path between the third rotary element and drive wheels. In control of the hybrid vehicle, when at least one of the first rotary machine and the second rotary machine is operated with a predetermined positive or negative maximum torque, the electronic control unit controls a slip amount of the engaging device by changing the torque capacity of the engaging device.

7 Claims, 16 Drawing Sheets

(51) Int. Cl.
- *B60W 10/08* (2006.01)
- *B60K 6/445* (2007.10)
- *B60K 6/547* (2007.10)
- *B60W 10/115* (2012.01)
- *B60W 20/00* (2006.01)
- *B60W 30/19* (2012.01)
- *F16H 61/04* (2006.01)
- *F16H 61/66* (2006.01)

(52) U.S. Cl.
CPC ....... *B60W2510/083* (2013.01); *B60Y 2300/74* (2013.01); *F16H 2061/0462* (2013.01); *F16H 2061/6602* (2013.01); *F16H 2342/044* (2013.01); *Y02T 10/6239* (2013.01); *Y10T 477/23* (2015.01); *Y10T 477/26* (2015.01)

(56) References Cited

U.S. PATENT DOCUMENTS

| | | | |
|---|---|---|---|
| 2007/0202987 A1* | 8/2007 | Kakinami et al. | 477/3 |
| 2007/0254764 A1* | 11/2007 | Shibata et al. | 475/117 |
| 2009/0076693 A1* | 3/2009 | Kumazaki et al. | 701/55 |
| 2009/0114464 A1* | 5/2009 | Imamura et al. | 180/65.285 |
| 2009/0134820 A1* | 5/2009 | Sugiyama et al. | 318/66 |

\* cited by examiner

|  | C1 | C2 | B1 | B2 | B3 | SPEED RATIO | STEP |
|---|---|---|---|---|---|---|---|
| 1st | ○ |  |  |  | ○ | 3.357 | 1.54 |
| 2nd | ○ |  |  | ○ |  | 2.180 | 1.53 |
| 3rd | ○ |  | ○ |  |  | 1.424 | 1.42 |
| 4th | ○ | ○ |  |  |  | 1.000 | TOTAL |
| R |  | ○ |  |  | ○ | 3.209 | 3.36 |
| N |  |  |  |  |  |  |  |

○ ENGAGED

FIG. 7

| CONTROL EXAMPLE | HYDRAULIC PRESSURE THAT CONTROLS C TO C SHIFT PROGRESSION | SHIFTING FASTER /SLOWER THAN TARGET SPEED | M1 TORQUE | M2 TORQUE | DIRECTION OF CHANGE OF TORQUE CAPACITY (HYDRAULIC PRESSURE) | CONTROL EXAMPLE |
|---|---|---|---|---|---|---|
| DOWNSHIFT | RELEASE-SIDE | SLOW | NEGATIVE MAXIMUM | POSITIVE MAXIMUM | REDUCTION | CONTROL EX. 1 |
| DOWNSHIFT | RELEASE-SIDE | FAST | POSITIVE MAXIMUM | NEGATIVE MAXIMUM | INCREASE | CONTROL EX. 2 |
| DOWNSHIFT | APPLY-SIDE | SLOW | NEGATIVE MAXIMUM | POSITIVE MAXIMUM | INCREASE | CONTROL EX. 3 |
| DOWNSHIFT | APPLY-SIDE | FAST | POSITIVE MAXIMUM | NEGATIVE MAXIMUM | REDUCTION | CONTROL EX. 4 |
| UPSHIFT | RELEASE-SIDE | SLOW | POSITIVE MAXIMUM | NEGATIVE MAXIMUM | REDUCTION | CONTROL EX. 5 |
| UPSHIFT | RELEASE-SIDE | FAST | NEGATIVE MAXIMUM | POSITIVE MAXIMUM | INCREASE | CONTROL EX. 6 |
| UPSHIFT | APPLY-SIDE | SLOW | POSITIVE MAXIMUM | NEGATIVE MAXIMUM | INCREASE | CONTROL EX. 7 |
| UPSHIFT | APPLY-SIDE | FAST | NEGATIVE MAXIMUM | POSITIVE MAXIMUM | REDUCTION | CONTROL EX. 8 |

CONTROL SYSTEM, CONTROL DEVICE, AND CONTROL METHOD FOR HYBRID VEHICLE

INCORPORATION BY REFERENCE

The disclosure of Japanese Patent Application No. 2013-060297 filed on Mar. 22, 2013 including the specification, drawings and abstract is incorporated herein by reference in its entirety.

BACKGROUND OF THE INVENTION

1. Field of the Invention

The invention relates to a control system, a control device, and a control method of a hybrid vehicular power transmission system that transmits power from an electric speed changing mechanism having a differential mechanism to drive wheels via an engaging device, and is particularly concerned with a technology for improving the durability of the engaging device, and suppressing engagement shock of the engaging device.

2. Description of Related Art

A hybrid vehicle including a differential mechanism having three rotary elements, i.e., a first rotary element to which an engine is coupled, a second rotary element to which a first rotary machine is coupled such that power can be transmitted therebetween, and a third rotary element as an output rotary member to which a second rotary machine is coupled, and an engaging device that transmits power delivered from the differential mechanism to drive wheels, is known. One example of this type of hybrid vehicle is described in Japanese Patent Application Publication No. 2007-002899 (JP 2007-002899 A). The hybrid vehicle of this type includes an electric steplessly speed changing unit and a stepwise speed changing unit, which are arranged in series. In the electric steplessly speed changing unit, the operating state of the differential mechanism is controlled by the first rotary machine, so that the speed ratio is electrically and steplessly or continuously controlled. The stepwise speed changing unit constitutes a power transmission path between an output rotary member of the electric speed changing mechanism and drive wheels. In operation, frictional engaging devices included in the stepwise speed changing unit are selectively engaged and released for changing the speed ratio, so that a selected one of a plurality of gear positions is established.

SUMMARY OF THE INVENTION

In the hybrid vehicle of JP 2007-002899 A, during shifting performed by releasing and engaging different frictional engaging devices in the stepwise speed changing unit, input clutch torque reduction control is performed so as to temporarily reduce the torque capacity of an input clutch so that transmission torque of the stepwise speed changing unit is limited to a given value or lower. With this arrangement, variations and temporary increase in output torque of the engine are not transmitted to the output shaft of the stepwise speed changing unit; therefore, shift shock of the stepwise speed changing unit is suppressed.

However, during running of the vehicle, the maximum torque condition of the first rotary machine that controls the steplessly speed changing unit, or that of the second rotary machine that convers electric power transmitted via an electric path into mechanical torque, may be influenced by the rating or load factor of the rotary machine in question. In this case, if the engaging device is engaged for gear shifting of the stepwise speed changing unit, the durability of the engaging device may be impaired, or engagement shock may occur. For example, where the maximum torque condition of the first rotary machine and/or the second rotary machine is influenced when the engaging device is engaged for gear shifting of the stepwise speed changing unit, and the engagement torque capacity of the engaging device is relatively high, the slip amount of the engaging device is increased and the quantity of heat absorbed is increased if the shift progression speed is slower than a target shift progression speed; therefore, the durability of its friction material is impaired. Also, if the shift progression speed is faster than the target speed, shift shock occurs at the time of completion of the shifting.

The invention provides a control system, control device, and a control method for an engaging device for a hybrid vehicle, which do not suffer from reduction of the durability of the engaging device and occurrence of engagement shock, even when the maximum torque condition of a first rotary machine and/or a second rotary machine is influenced during shifting of a stepwise speed changing unit.

A first aspect of the invention is concerned with a control system for a hybrid vehicle. The control system includes an electric steplessly speed changing unit, an engaging device, and an electronic control unit. The electric steplessly speed changing unit includes a differential mechanism including a first rotary element to which an engine is coupled, a second rotary element to which a first rotary machine is coupled, and a third rotary element that is an output rotary member of the differential mechanism to which a second rotary machine is coupled. Differential operation of the electric steplessly speed changing unit is controlled by a controlling operation of the first rotary machine. The engaging device is provided in a power transmission path between the third rotary element and drive wheels. The electronic control unit is configured to control a slip amount of the engaging device by changing a torque capacity of the engaging device, when at least one of the first rotary machine and the second rotary machine is operated with a predetermined positive or negative maximum torque.

With the above arrangement, when at least one of the first rotary machine and the second rotary machine is operated with the positive or negative predetermined maximum torque, the slip amount (slipping condition) of the engaging device is controlled by changing the torque capacity of the engaging device, so that the slipping condition of the engaging device can be made close to a predetermined target slipping condition. Thus, the durability of the engaging device is less likely to be impaired or reduced, and engagement shock is favorably suppressed.

In the control system as described above, the maximum torque of the first rotary machine or the second rotary machine may be the rated torque permitted based on the specifications of the first rotary machine and the second rotary machine. In the control system as described above, the maximum torque of the first rotary machine or the second rotary machine may be a maximum limit torque that is limited by the load factor or heat permitted by the first rotary machine or the second rotary machine. Namely, in the control system, the predetermined maximum torque of the first rotary machine may be a maximum limit torque that is limited by heat of the first rotary machine, and the predetermined maximum torque of the second rotary machine may be a maximum limit torque that is limited by heat of the second rotary machine.

In the control system as described above, the electronic control unit may change the torque capacity of the engaging device from a pre-stored relationship derived from an equation of motion, based on the maximum torque of the actual first rotary machine or second rotary machine, and a predetermined target rate of change of an input shaft speed of the engaging device. With this arrangement, slip control is performed on the engaging device so as to achieve a predetermined target input shaft rotational acceleration, namely, to achieve a target slipping condition.

The control system as described above may further include an automatic speed changing unit provided between the differential mechanism and the drive wheels, and including the engaging device for switching gear positions of the automatic speed changing unit. Also, in the control system, in slip amount control (slip control) of the engaging device performed when output torque of the second rotary machine is limited by the positive maximum torque and when a rate of change of a rotational speed of an input shaft of the automatic speed changing unit (or a rate of change of the rotational speed of the second rotary machine directly coupled to the input shaft) is lower than a predetermined target rate of change (a target rate of change of the input shaft rotational speed), the electronic control unit may perform at least one of a correction to increase the torque capacity of the engaging device whose input rotational speed is lower than an output rotational speed of the engaging device, and a correction to reduce the torque capacity of the engaging device whose output rotational speed is lower than the input rotational speed of the engaging device. With this arrangement, slip control is performed on the engaging device by increasing the rate of increase of the input rotational speed of the engaging device (or the rotational speed of the second rotary machine directly coupled to the engaging device) so as to achieve the target input shaft speed change rate.

The control system may further include an automatic speed changing unit provided between the differential mechanism and the drive wheels, and including the engaging device for switching gear positions of the automatic speed changing unit. Also, in the control system, in slip amount control (slip control) of the engaging device performed when output torque of the second rotary machine is limited by the positive maximum torque and when an input rotational speed of the engaging device is lower than an output rotational speed of the engaging device, the electronic control unit may increase the torque capacity of the engaging device when a rate of change of a rotational speed of an input shaft of the automatic speed changing unit (input shaft speed change rate) is lower than a predetermined target rate of change (target input shaft speed change rate) (since the rate of increase of the input shaft speed is low), and may reduce the torque capacity of the engaging device when the rate of change of the rotational speed of the input shaft of the automatic speed changing unit (input shaft speed change rate) is higher than the target rate of change (since the rate of increase of the input shaft speed is high). With this arrangement, slip control is performed on the engaging device so as to achieve the predetermined target rotational acceleration (target input shaft rotational acceleration) of the input shaft, namely, to achieve a target slipping condition.

When the stepwise speed changing unit performs clutch-to-clutch shifting, the engaging device may be one of a release-side frictional engaging device and an apply-side frictional engaging device that are successively released and engaged for clutch-to-clutch shifting.

A second aspect of the invention is concerned with a control device for a hybrid vehicle. The hybrid vehicle includes an electric steplessly speed changing unit and an engaging device. The electric steplessly speed changing unit includes a differential mechanism including a first rotary element to which an engine is coupled, a second rotary element to which a first rotary machine is coupled, and a third rotary element that is an output rotary member of the differential mechanism to which a second rotary machine is coupled. The engaging device is provided in a power transmission path between the third rotary element and drive wheels. The control device includes an electronic control unit. The electronic control unit is configured to control an output torque of the first rotary machine and an output torque of the second rotary machine, configured to control a differential operation of the electric sleeplessly speed changing unit by controlling the output torque of the first rotary machine, and configured to control a slip amount of the engaging device by changing a torque capacity of the engaging device, when at least one of the first rotary machine and the second rotary machine is operated with a predetermined maximum torque that is positive or negative.

A third aspect of the invention is concerned with a control method for a hybrid vehicle. The hybrid vehicle includes an electric steplessly speed changing unit, an engaging device, and an electronic control unit. The electric steplessly speed changing unit includes a differential mechanism including a first rotary element to which an engine is coupled, a second rotary element to which a first rotary machine is coupled, and a third rotary element that is an output rotary member of the differential mechanism to which a second rotary machine is coupled. Differential operation of the electric steplessly speed changing unit is controlled by controlling operation of the first rotary machine. The engaging device is provided in a power transmission path between the third rotary element and drive wheels. The control method includes controlling a slip amount of the engaging device by changing a torque capacity of the engaging device by the electronic control unit, when at least one of the first rotary machine and the second rotary machine is operated with a predetermined positive or negative maximum torque.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 7 is a table explaining operation of a torque capacity changing unit of FIG. 5;

DETAILED DESCRIPTION OF EMBODIMENTS

Embodiments of the invention will be described in detail with reference to the drawings.

Figures 1, 2:
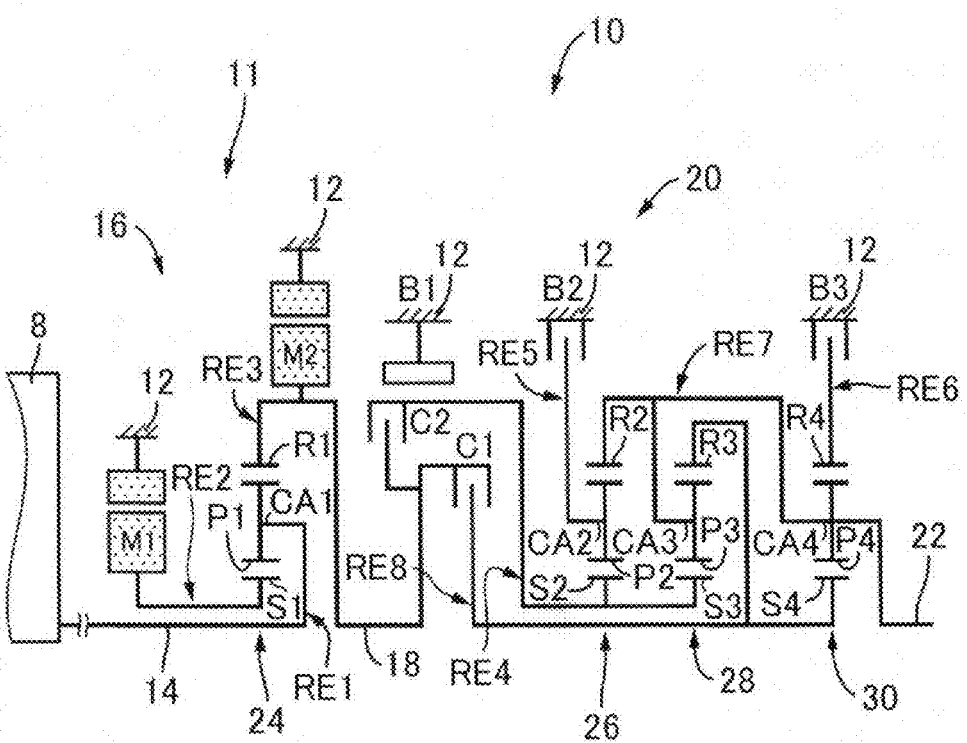
FIG. 1 is a skeleton diagram illustrating the construction of a power transmission mechanism of a hybrid vehicle to which the invention is applied.
FIG. 2 is a table indicating the relationships between the gear positions (speeds) of a stepwise speed changing unit of FIG. 1, and engagement of hydraulic friction devices for establishing each of the gear positions.

FIG. 1 is a skeleton diagram illustrating a shift mechanism 10 as a power transmission mechanism that constitutes a drive system of a hybrid vehicle to which this invention is applied. In FIG. 1, the shift mechanism 10 includes an input shaft 14 as an input rotary member, an electrically controlled differential portion 11 that can function as a continuously variable transmission portion, an automatic transmission portion 20 as a power transmitting portion, and an output shaft 22 as an output rotary member, which are disposed on a common axis in a transmission case 12 (which will be called "case 12") as a stationary member mounted on the vehicle body, and are arranged in series. The electrically controlled differential portion 11 is coupled directly or indirectly, i.e., via a pulsation absorbing damper (vibration damping device) (not shown), to the input shaft 14. The automatic transmission portion 20 is coupled in series with the differential portion 11 via a transmitting member (power transmission shaft) 18, in a power transmission path between the differential portion 11 and drive wheels 34 (see FIG. 5). The output shaft 22 is coupled to the automatic transmission portion 20. The shift mechanism 10 is suitably used in a FR (front-engine, rear-drive) type vehicle in which the mechanism 10 is vertically mounted, for example. The shift mechanism 10 is provided in a power transmission path between an engine, such as a gasoline engine or a diesel engine, which serves as a source of driving force for running the vehicle, and is coupled directly or via a pulsation absorbing damper to the input shaft 14, and a pair of drive wheels 34, and transmits power from the engine 8, to the pair of drive wheels 34, via a differential gear set (final reduction gear) 32 (see FIG. 5), a pair of axles, etc.

In the shift mechanism 10 of this embodiment, the engine 8 and the differential portion 11 are directly coupled to each other. The "direct coupling" means coupling with no hydraulic power transmission device, such as a torque converter or a fluid coupling, interposed therebetween. For example, mechanical coupling via the pulsation absorbing damper as described above is included in the meaning of the direct coupling. Since the shift mechanism 10 is constructed symmetrically with respect to the axis thereof, the lower half of the shift mechanism 10 is not illustrated in the skeleton diagram of FIG. 1. This also applies to each of the embodiments.

The differential portion 11 includes a first electric motor M1 (which will be called "first motor M1") that functions as a first rotary machine, a differential mechanism 16 that is a mechanical mechanism that mechanically distributes the power of the engine 8 delivered to the input shaft 14, to the first electric motor M1 and the transmitting member 18, and a second electric motor M2 (which will be called "second motor M2") that functions as a second rotary machine operatively coupled to the transmitting member 18 so as to rotate as a unit with the transmitting member 18. While each of the first motor M1 and the second motor M2 of this embodiment is a so-called motor-generator having a power generating function, the first motor M1 has at least a generator (electric power generating) function for generating reaction force, while the second motor M2 has at least a motor (electric motor) function for delivering driving force as a source of driving force for running the vehicle.

The differential mechanism 16 consists principally of a single-pinion-type first planetary gear set 24 having a gear ratio of $\rho 1$. The first planetary gear set 24 includes a first sun gear S1, a first planetary gear P1, a first carrier CA1 that supports the first planetary gear P1 such that the gear P1 can rotate about itself and about the axis of the gear set 24, and a first ring gear R1 that meshes with the first sun gear S1 via the first planetary gear P1, as rotary elements (elements). Where ZS1 denotes the number of teeth of the first sun gear S1, and ZR1 denotes the number of teeth of the first ring gear R1, the above-indicated gear ratio $\rho 1$ is expressed as ZS1/ZR1.

In the differential mechanism 16, the first carrier CA1 is coupled to the input shaft 14, or the engine 8, and the first sun gear S1 is coupled to the first motor M1, while the first ring gear R1 is coupled to the transmitting member 18. In operation, the first sun gear S1, first carrier CA1, and the first ring gear R1 as three elements of the first planetary gear set 24 can rotate relative to each other, to operate in a differential state. In the differential state, the power of the engine 8 is distributed to the first motor M1 and the transmitting member 18, and electric energy generated from the first motor M1 with a part of the power of the engine 8 thus distributed is stored, or used for rotating/driving the second motor M2. Thus, the differential portion 11 functions as an electric differential device, namely, functions as an electric continuously variable transmission (CVT), or an electric steplessly speed changing unit, of which the speed ratio $\gamma 0$ (the rotational speed $N_{IN}$ of the input shaft 14/the rotational speed $N_{18}$ of the transmitting member 18) is continuously varied from the minimum value $\gamma 0 min$ to the maximum value $\gamma 0 max$.

The automatic transmission portion 20 is a planetary gear type, multi-speed transmission that functions as a stepwise speed changing unit, and includes a single-pinion-type second planetary gear set 26, a single-pinion-type third planetary gear set 28, and a single-pinion-type fourth planetary gear set 30. The second planetary gear set 26 includes a second sun gear S2, a second planetary gear P2, a second carrier CA2 that supports the second planetary gear P2 such that the gear P2 is rotatable about itself and about the axis of the gear set 26, and a second ring gear R2 that meshes with the second sun gear S2 via the second planetary gear P2. The third planetary gear set 28 includes a third sun gear S3, a third planetary gear P3, a third carrier CA3 that supports the third planetary gear P3 such that the gear P3 is rotatable about itself and about the axis of the gear set 28, and a third ring gear R3 that meshes with the third sun gear S3 via the third planetary gear P3. The fourth planetary gear set 30 includes a fourth sun gear S4, a fourth planetary gear P4, a fourth carrier CA4 that supports the fourth planetary gear P4 such that the gear P4 is rotatable about itself and about the axis of the gear set 30, and a fourth ring gear R4 that meshes with the fourth sun gear S4 via the fourth planetary gear P4.

In the automatic transmission portion 20, the second sun gear S2 and the third sun gear S3, which are coupled integrally with each other, are selectively coupled to the transmitting member 18 via a second clutch C2, and selectively coupled to the case 12 via a first brake B1, and the second carrier CA2 is selectively coupled to the case 12 via a second brake B2, while the fourth ring gear R4 is selectively coupled to the case 12 via a third brake B3. The second ring gear R2, third carrier CA3, and the fourth carrier CA4, which are coupled integrally with each other, are coupled to the output shaft 22, and the third ring gear R3 and the fourth sun gear S4, which are coupled integrally with each other, are selectively coupled to the transmitting member 18 via a first clutch C1.

The interior of the automatic transmission portion 20 and the transmitting member 18 of the differential portion 11 are selectively coupled via the first clutch C1 or second clutch C2 used for establishing a selected gear position of the automatic transmission portion 20, and the power of the engine 8 is transmitted to the automatic transmission portion 20, via the differential portion 11, and the first clutch C1 and/or the second clutch C2. When at least one of the first clutch C1 and the second clutch C2 is engaged, the power transmission path is placed in a power transmittable state. When the first clutch C and the second clutch C2 are both released, the power transmission path is placed in a power transmission cut-off state.

The automatic transmission portion 20 is a transmission having two or more gear positions, in which clutch-to-clutch shifting is performed by releasing a release-side engaging device and engaging an apply-side engaging device, so that each gear position (speed) is selectively established, to provide a speed ratio $\gamma$ (=the rotational speed $N_{18}$ of the transmitting member 18/the rotational speed $N_{OUT}$ of the output shaft 22) for each gear position. The speed ratio $\gamma$ changes substantially proportionally from one gear position to the next gear position. As indicated in the engaging operation table of FIG. 2, the first-speed gear position is established by engaging the first clutch C1 and the third brake B3, and the second-speed gear position is established by engaging the first clutch C1 and the second brake B2, while the third-speed gear position is established by engaging the first clutch C1 and the first brake B1, and the fourth-speed gear position is established by engaging the first clutch C1 and the second clutch C2. Thus, when the transmission is shifted from one gear position to another, clutch-to-clutch shifting is performed by successively releasing a release-side engaging device as one of a pair of engaging devices involved with the shifting, and engaging an apply-side engaging device as the other engaging device.

The first clutch C1, second clutch C2, first brake B1, second brake B2, and the third brake B3 (which will be denoted as clutch C, or brake B, when they are not particularly distinguished) are hydraulically operated frictional engaging devices (engaging devices) often used in conventional automatic transmissions for vehicles. The engaging device may be a wet multiple disc clutch having a plurality of superimposed friction plates that are pressed by a hydraulic actuator, or a band brake having a band or two bands whose one end wound around an outer circumferential surface of a rotating drum is drawn tight by a hydraulic actuator, for example, and serves to selectively couple the opposite members between which the engaging device is interposed.

In the shift mechanism 10 constructed as described above, the differential portion 11 that functions as a continuously variable transmission and the automatic transmission portion 20 that functions as a stepwise variable transmission constitute a continuously variable transmission whose overall speed ratio is steplessly or continuously varied. By controlling the speed ratio of the differential portion 11 to be constant as needed, as in the manual mode, the differential mechanism 16 and the automatic transmission portion 20 may constitute an arrangement equivalent to a stepwise variable transmission in which the speed ratio is changed in steps.

Figure 3:
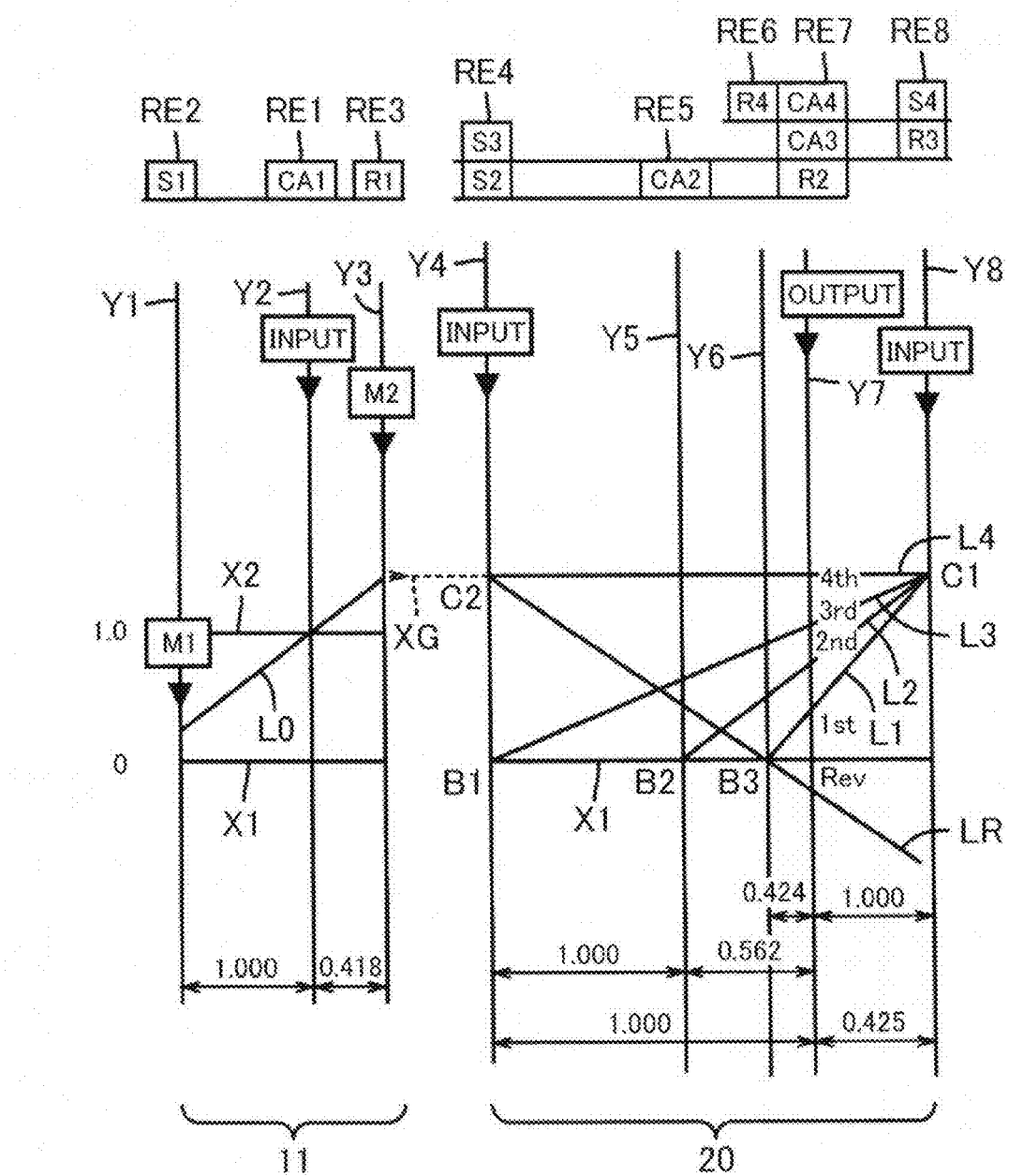
FIG. 3 is a nomographic chart indicating the relationships of rotational speeds of respective rotary elements in a power distribution mechanism included in the power transmission system of the hybrid vehicle.

FIG. 3 shows a nomographic chart indicating, on straight lines, the relationships of the rotational speeds of respective rotary elements that are placed in different coupling states for each gear position, in the shift mechanism 10 that consists of the differential portion 11 and the automatic transmission portion 20. The nomographic chart of FIG. 3 is a two-dimensional coordinate system that consists of the horizontal axis indicating the relationship among the gear ratios $\rho$ of the respective planetary gear sets 24, 26, 28, 30, and the vertical axis indicating relative rotational speeds. In FIG. 3, horizontal line X1 indicates a rotational speed of zero, and horizontal line X2 indicates a rotational speed of "1.0", namely, the rotational speed $N_E$ of the engine 8 coupled to the input shaft 14, while horizontal line XG indicates the rotational speed of the transmitting member 18.

In the automatic transmission portion 20, a fourth rotary element RE4 is selectively coupled to the transmitting member 18 via the second clutch C2, and is selectively coupled to the case 12 via the first brake B1, and a fifth rotary element RE5 is selectively coupled to the case 12 via the second brake B2. A sixth rotary element RE6 is selectively coupled to the case 12 via the third brake B3, and a seventh rotary element RE7 is coupled to the output shaft 22, while an eighth rotary element RE8 is selectively coupled to the transmitting member 18 via the first clutch C1.

Figure 4:
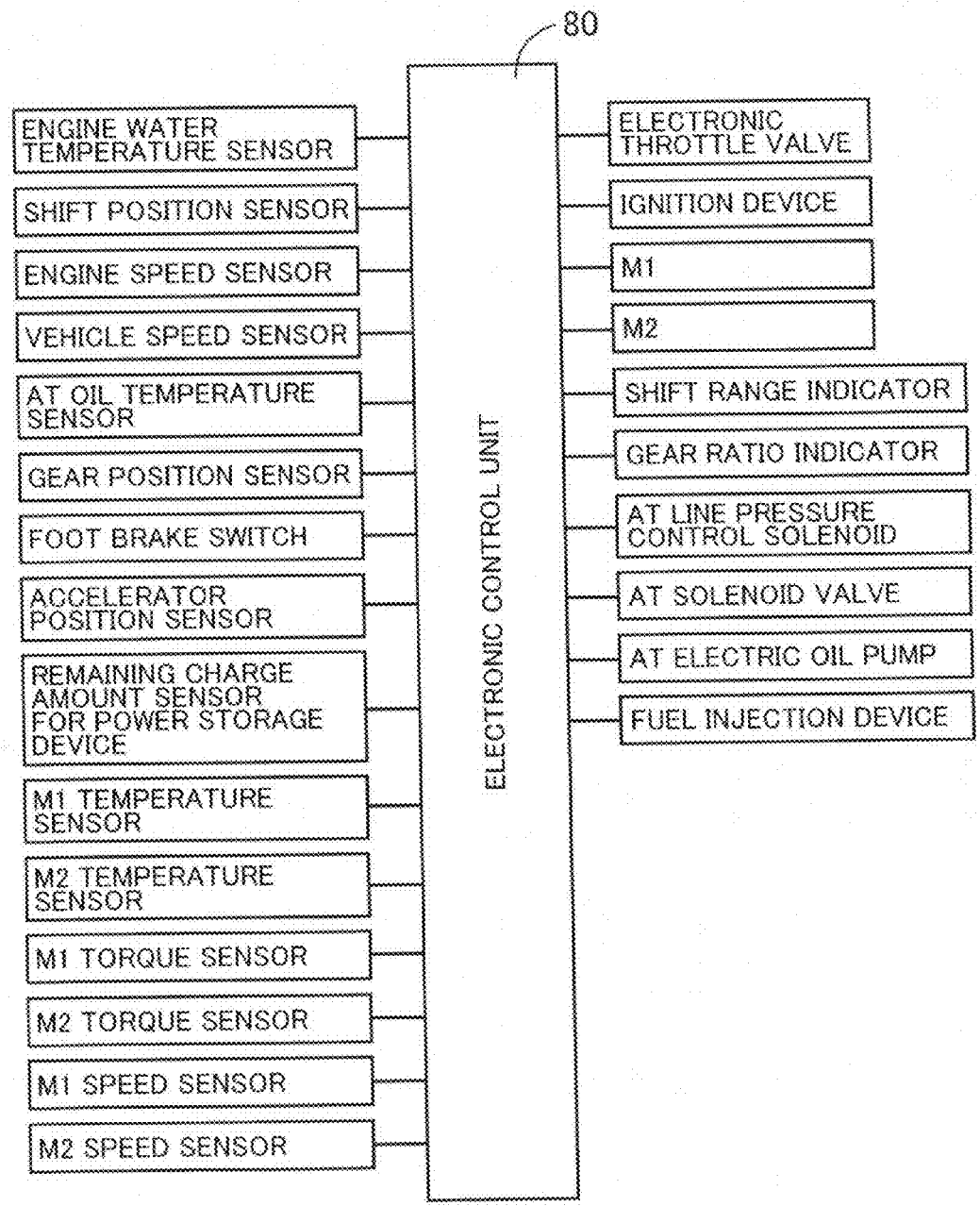
FIG. 4 is a view useful for explaining input and output relationships of an electronic control unit provided in the vehicle of FIG. 1.

FIG. 4 shows examples of signals received by an electronic control unit 80 for controlling the shift mechanism 10 of this embodiment, and signals generated from the electronic control unit 80. The electronic control unit 80 includes a so-called microcomputer that consists of CPU, ROM, RAM, input and output interfaces, etc., and performs signal processing according to programs stored in advance in the ROM, while utilizing the temporarily storing function of the RAM, so as to execute drive control, such as hybrid drive control concerning the engine 8, first motor M1, and the second motor M2, and shift control of the automatic transmission portion 20.

Various signals are supplied from respective sensors and switches as shown in FIG. 4, to the electronic control unit 80. The signals include, for example, a signal indicative of the engine water temperature $TEMP_W$, a signal indicative of the shift position $P_{SH}$ of the shift lever 52 (see FIG. 5), a signal indicative of the engine speed $N_E$ as the rotational speed of the engine 8, a signal indicative of the vehicle speed V corresponding to the rotational speed $N_{OUT}$ ($min^{-1}$) of the output shaft 22 (which will be called "output shaft speed"), a signal indicative of the hydraulic oil temperature $T_{OIL}$ (° C.) of the automatic transmission portion 20, a signal indicative of the gear position of the automatic transmission portion 20, a signal indicative of a foot brake operation, a signal indicative of the accelerator pedal position Acc (%) as the operation amount of the accelerator pedal corresponding to the amount of output required by the driver, a signal indicative of the temperature of the first motor M1, a signal indicative of the temperature of the second motor M2, a signal indicative of the output torque (drive current command value) of the first motor M1, a signal indicative of the output torque (drive current command value) of the second motor M2, a signal indicative of the rotational speed $N_{M1}$ of the first motor M1

(which will be called "first motor speed $N_{M1}$"), a signal indicative of the rotational speed $N_{M2}$ of the second motor M2 (which will be called "second motor speed $N_{M2}$"), a signal indicative of the remaining amount of charge (terminal voltage) SOC of a power storage device 56 (see FIG. 5), and so forth.

Also, various signals are generated from the electronic control unit 80. The signals include, for example, control signals to an engine output control device 58 (see FIG. 5) that controls engine output, including a drive signal to a throttle actuator 64 that controls the throttle opening $\theta_{TH}$ of an electronic throttle valve 62 provided in an intake pipe 60 of the engine 8, a fuel supply amount signal that controls the amount of fuel supplied into the intake pipe 60 or a cylinder of the engine 8 via a fuel injection device 66, and an ignition signal that instructs the ignition timing of the engine 8 by an ignition device 68. The signals also include a command signal that instructs operations of the first motor M1 and the second motor M2, a shift position (selected position) display signal for actuating a shift indicator, a gear-ratio display signal for displaying the gear ratio, valve command signals that actuate electromagnetic valves (AT linear solenoid valves) included in a hydraulic control circuit 70 for controlling hydraulic actuators of the hydraulically operated frictional engaging devices of the differential portion 11 and automatic transmission portion 20, a signal for regulating the line pressure $P_L$ by means of a regulator valve (pressure regulation valve) provided in the hydraulic control circuit 70, a drive command signal for actuating an electric hydraulic pump as a source of hydraulic pressure (the original pressure) for regulating the line pressure $P_L$.

Figure 5:
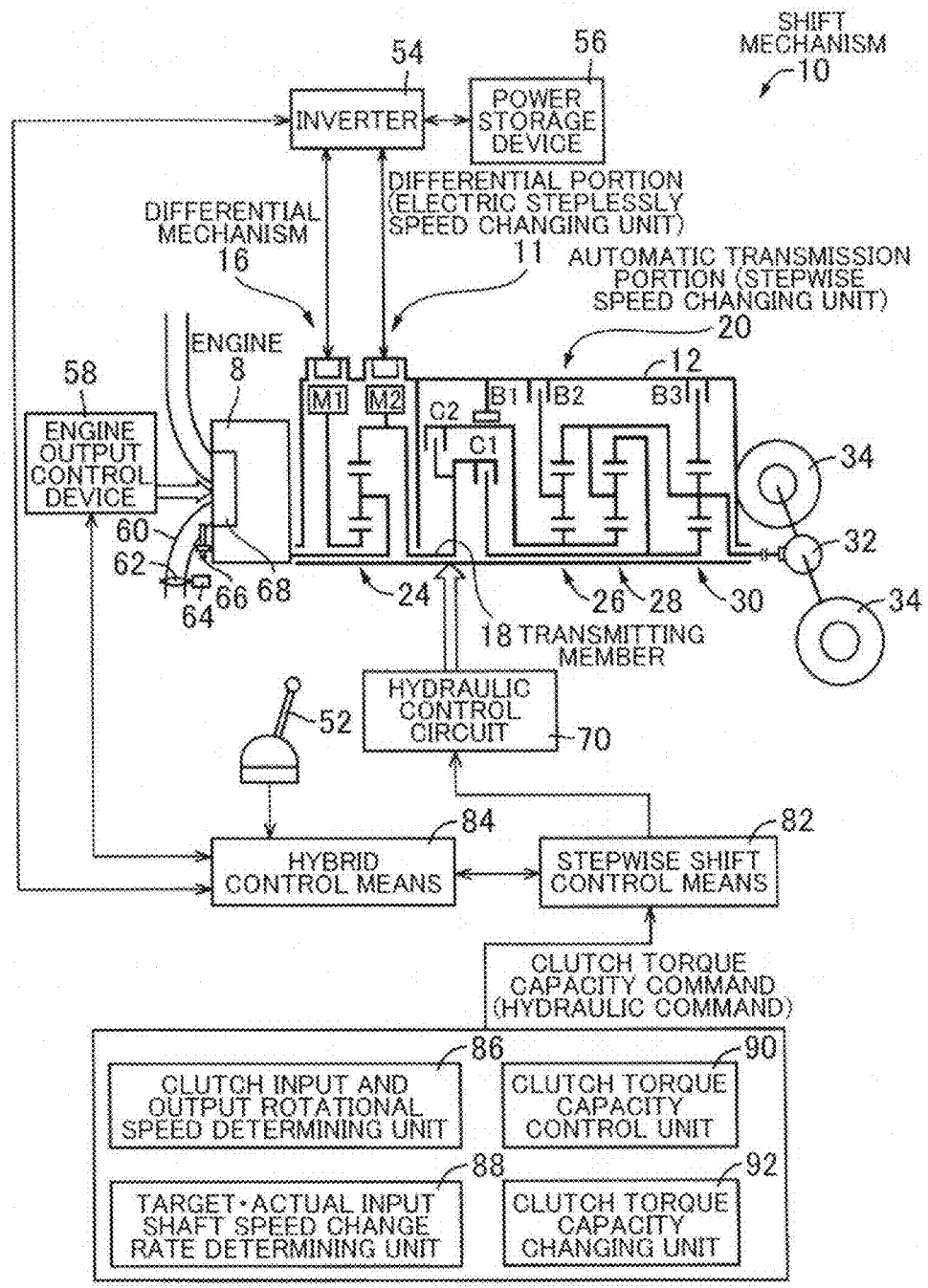
FIG. 5 is a functional block diagram useful for explaining principal control functions of the electronic control unit of FIG. 4.

FIG. 5 is a functional block diagram useful for explaining principal control functions performed by the electronic control unit 80. In FIG. 5, while the vehicle is running with power of the motor or engine, a stepwise shift control means 82 determines a target gear position or speed of the automatic transmission portion 20, based on vehicle conditions represented by the actual vehicle speed V and the required output torque $T_{OUT}$ of the automatic transmission portion 20, from relationships (shift diagram) having upshift lines (solid lines) and downshift lines (one-dot chain lines) stored in advance using the vehicle speed V and the required output torque $T_{OUT}$ of the automatic transmission portion 20 as parameters. Then, the stepwise shift control means 82 executes automatic shift control of the automatic transmission portion 20 so as to establish the gear position (speed) thus determined. The required output torque $T_{OUT}$ is calculated based on the actual accelerator pedal position Acc (%) and the vehicle speed V, from well-known relationships stored in advance.

At this time, the stepwise shift control means 82 generates a command (shift output command, hydraulic command) to engage and/or release the hydraulically operated frictional engaging device(s) involved with shifting of the automatic transmission portion 20, namely, a command to execute clutch-to-clutch shifting by releasing the release-side engaging device involved with shifting of the automatic transmission portion 20 and engaging the apply-side engaging device, to the hydraulic control circuit 70, so as to establish the gear position (speed) determined according to the engagement table as shown in FIG. 2, for example. The hydraulic control circuit 70 actuates a linear solenoid valve or valves SL in the hydraulic control circuit 70, to operate the hydraulic actuators of the hydraulically operated frictional engaging devices involved with the shifting, so as to release the release-side engaging device and engage the apply-side engaging device for shifting of the automatic transmission portion 20, according to the above command.

A hybrid control means 84 calculates a target (required) output of the vehicle from the accelerator pedal position Acc as the amount of output required by the driver, and the vehicle speed V, calculates the required or target total output from the target output of the vehicle and the required amount of charge, and determines whether the vehicle is in a motor running region or an engine running region, based on the target total output and the vehicle speed V, from a pre-stored relationship. If it is determined that the vehicle should run in the motor running region, the hybrid control means 84 runs the vehicle, using the second motor M2 exclusively as the driving source. If it is determined that the vehicle should run in the engine running region, the hybrid control means 84 calculates a target engine output and the total speed ratio γA of the shift mechanism 10, in view of a transmission loss, a load of accessories, assist torque of the second motor M2, etc., and controls the engine 8 to provide the engine speed $N_E$ and the engine torque $T_E$ so that the target engine output can be obtained. Also, the hybrid control means 84 controls the speed ratios of the differential mechanism 16 and the automatic transmission portion 20, so as to steplessly or continuously control the total speed ratio γA of the shift mechanism 10.

When the speed ratio of the automatic transmission portion 20 changes due to clutch-to-clutch shifting by the stepwise shift control means 82, the rotational speed of the transmitting member 18 is changed from a pre-shift value to a post-shift value. At this time, if the operation of at least one of the first motor M1 and the second motor M2 is restricted by a predetermined maximum torque of the positive side or negative side, a clutch input and output rotational speed determining unit 86, a target and actual input shaft speed change rate determining unit 88, a clutch torque capacity control unit 90, and a clutch torque capacity changing unit 92 are implemented to change the torque capacity of an engaging device involved with the clutch-to-clutch shifting, so as to curb reduction of the durability of the engaging device due to its slip, and suppress shift shock due to rapid engagement of the engaging device. The predetermined maximum torque may be the rated torque permitted from the specifications of the first motor M1 and the second motor M2, or may be the maximum limit torque limited based on the load factor, or heat requirement, permitted by the first motor M1 and the second motor M2.

Figure 6:
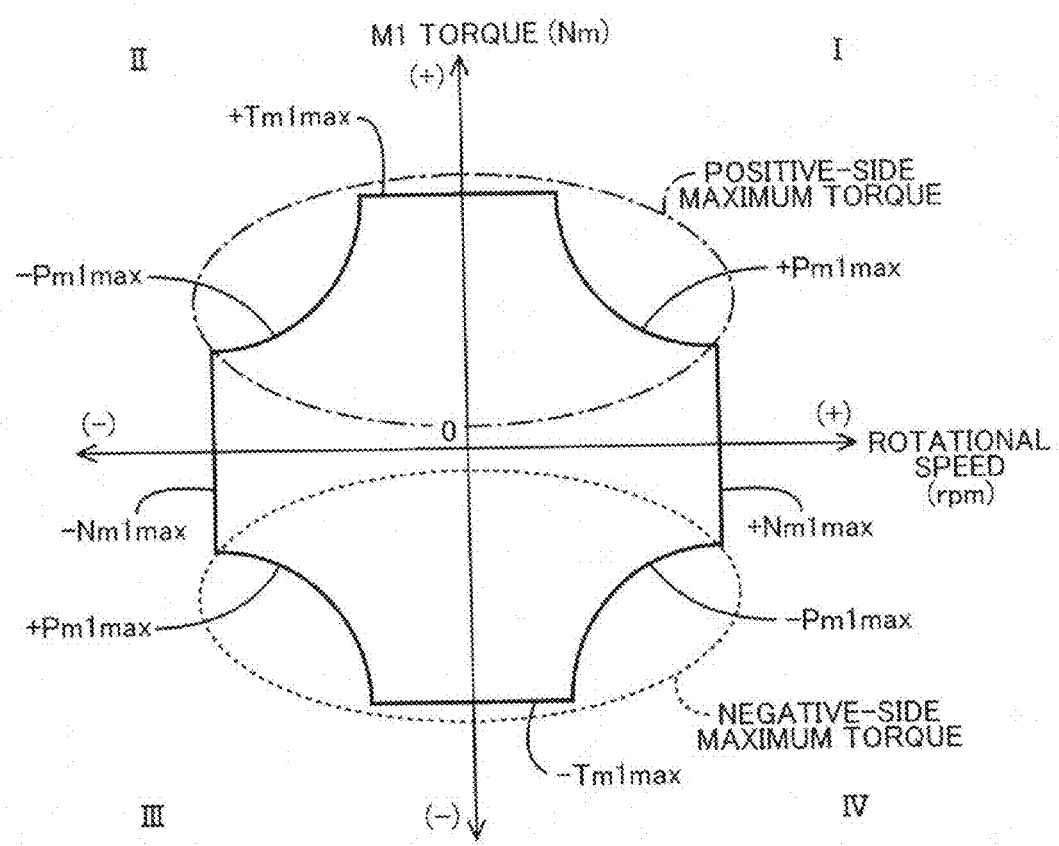
FIG. 6 is a view useful for explaining the maximum torque of a first motor of FIG. 1 and FIG. 5 determined from boundary lines indicating an operating region of the first motor.

Generally, an operable range of an electric motor is defined based on the specifications and load factor for assuring the durability thereof, for example, and an operable range of the first motor M1 is indicated in FIG. 6, for example. Namely, in FIG. 6, an operating region surrounded by boundary lines representing the positive-side upper-limit rotational speed (+Nm1max), negative-side upper-limit rotational speed (−Nm1max), positive-side upper-limit torque (+Tm1max), negative-side upper-limit torque (−Tm1max), and the positive-side upper-limit power (+Pm1max) and negative-side upper-limit power (−Pm1max) is defined in advance, and the first motor M1 is controlled so as to operate within this operating region. The second motor M2 is also controlled in the same manner. When the vehicle is running forward in the engine running mode, the first motor M1 is caused to operate in a regenerative mode exclusively in the IV quadrant of FIG. 6, so as to generate reaction force and transmit direct torque from the engine 8 to the transmitting member 18. If the vehicle speed becomes extremely high, the first motor M1 is caused to operate in a power running mode in the III quadrant of FIG. 6, so as to transmit direct torque from the engine 8 to the transmitting member 18.

The positive and negative regions of the rotational speed of the first motor M1 in FIG. 6 are represented by the upper region and lower region defined with reference to a point indicating zero-speed rotation in the nomographic chart as shown in FIG. 3. Also, the positive and negative directions of the output torque of the first motor M1 are represented by the upward direction and downward direction in the nomographic chart of FIG. 3. Therefore, the negative torque of the first motor M1 may be expressed as torque applied in such a direction as to increase the rotational speed of the second motor M2, as is apparent from the nomographic chart. Here, the negative maximum torque of the first motor M1 is a torque value indicated by a boundary line surrounded by a broken line in FIG. 6, namely, a boundary line within the III quadrant and IV quadrant in FIG. 6. Also, the positive maximum torque of the first motor M1 is a torque value indicated by a boundary line surrounded by a one-dot chain line in FIG. 6, namely, a boundary line within the I quadrant and II quadrant in FIG. 6. While the negative maximum torque and the positive maximum torque may be set to fixed values strictly set in advance, they may be sequentially determined based on the actual temperature or load factor of the first motor M1.

The clutch input and output rotational speed determining unit 86 initially determines whether, during clutch-to-clutch shifting performed by the stepwise shift control means 82, one of a pair of engaging devices involved with the clutch-to-clutch shifting, as a predetermined object to be controlled, namely, the release-side engaging device or the apply-side engaging device, is slipping in a clutch-to-clutch shift period, based on a difference in the rotational speed between the input member and output member of the engaging device. Then, the clutch input and output rotational speed determining unit 86 determines which direction in which the rotation of the input member of the engaging device that is slipping changes relative to that of the output member. For example, it is determined whether the engaging device to be controlled by correcting the hydraulic pressure is the release-side engaging device or the apply-side engaging device.

The target•actual input shaft speed change rate determining unit 88 determines whether the speed of progression of the shifting is faster or slower than a target shift progression speed, based on a difference between the actual rate of change $d\omega m/dt$ (rad/sec2) of the rotational speed corn (rad/sec) of the second motor M2 or the transmitting member 18, or the input shaft speed of the automatic transmission portion 20, which change occurs due to slip of the engaging device in the inertia phase within the clutch-to-clutch shift period, and a preset target input shaft speed change rate (rad/sec2). In the inertia phase within the clutch-to-clutch shift period, the rotational speed corn of the transmitting member 18 or the second motor M2 changes from a pre-shift value to a post-shift value; therefore, the target input shaft speed change rate, namely, the target shift progression speed, is determined so as to avoid shift shock without impairing shift response.

The clutch torque capacity control unit 90 controls the torque capacities of the engaging devices involved with clutch-to-clutch shifting, by instructing the stepwise shift control means 82 to generate engaging pressures (basic values) of the release-side frictional engaging device and the apply-side frictional engaging device involved with the clutch-to-clutch shifting, according to the input torque of the automatic transmission portion 20, so as to carry out the clutch-to-clutch shifting at the target shift progression speed.

The clutch torque capacity changing unit 92 changes the torque capacity based on pre-stored relationships, for example. The clutch torque capacity changing unit 92 initially determines the direction of change or correction of the torque capacity, i.e., whether the torque capacity of the engaging device that is determined as being slipping is increased or reduced, based on (a) whether the engaging device determined by the clutch input and output rotational speed determining unit 86 as being slipping, out of the pair of engaging devices involved with the clutch-to-clutch shifting, is the release-side engaging device or the apply-side engaging device determined by the clutch input and output rotational speed determining unit 86, (b) whether the progression of clutch-to-clutch shifting determined by the target•actual input shaft speed change rate determining unit 88 is faster or slower than the target speed, and (c) whether the torque of the first motor M1 or the second motor M2 is limited by the negative-side maximum torque or positive-side maximum torque, and the negative or positive torque of the first motor M1 or the second motor M2 is insufficient, as indicated in the table of FIG. 7. Whether the torque of the first motor M1 or the second motor M2 is limited by the negative-side maximum torque or positive-side maximum torque is determined based on whether the actual output torque of the first motor M1 or the second motor M2 corresponding to a drive current command value, for example, reaches the predetermined negative-side maximum torque or positive-side maximum torque.

Then, the clutch torque capacity changing unit 92 sequentially calculates the torque capacity (torque capacity after changed) Tct, based on the maximum torque and the target input shaft speed change rate (the target input shaft speed change rate $d\omega m2^*/dt$ corresponding to the target shift progression speed), from a relationship (map) theoretically or empirically determined in advance and stored so that the target shift progression speed can be obtained when the torque of the engaging device to be controlled is limited by the maximum torque. The above-mentioned relationship is created in advance so as to satisfy Eq. (1) below, for example. The clutch torque capacity changing unit 92 changes the torque capacity from the torque capacity Tc to the calculated post-change torque capacity Tct. As a result, the torque capacity Tc is corrected by a difference between Tc and Tct, into the post-change torque capacity Tct.

The above-mentioned Eq. (1) is derived from two motion equations related to the differential mechanism 16, and A and B are constants. One motion equation is an equation that expresses the torque capacity Tc of the engaging element by an added value of a function value of the torque Tm2 of the second motor M2 and the torque Tm1 of the first motor M1, and a function value of the input shaft speed change rate $d\omega m2/dt$ of the automatic transmission 20 and the rotational acceleration $d\omega e/dt$ of the engine 8, and the other motion equation is an equation that expresses the torque Te of the engine 8 by an added value of a function value of the torque Tm2 of the second motor M2 and the torque Tm1 of the first motor M1, and a function value of the input shaft rotational acceleration $d\omega m2/dt$ of the automatic transmission 20 and the rotational acceleration $d\omega e/dt$ of the engine 8. The motion equations are represented by a matrix equation (2) below. The matrix equation (2), from which the torque Te and rotational acceleration $d\omega e/dt$ of the engine 8 are removed, is organized into an equation for calculation of the torque capacity Tc of the engaging element. Then, the maximum torque is introduced into the calculation equation in place of the torque Tm2 of the second motor M2 and the torque Tm1 of the first motor M1, and the target input shaft speed change rate $d\omega m2^*/dt$ is introduced in place of the input shaft speed change rate $d\omega m2/dt$ of the automatic transmission 20, so as to provide Eq. (2). In Eq. (2), a11, a12, a21, a22, b11, b12, b21, and b22 are constants.

$$Tct = \qquad (1)$$
$$A \times \text{Maximum Torque} + B \times \text{Target Input Shaft Speed Change Rate}$$

$$\begin{pmatrix} Tc \\ Te \end{pmatrix} = \begin{pmatrix} a11 & a12 \\ a21 & a22 \end{pmatrix} \begin{pmatrix} Tm2 \\ Tm1 \end{pmatrix} + \begin{pmatrix} b11 & b12 \\ b21 & b22 \end{pmatrix} \begin{pmatrix} \dot{\omega}m2 \\ \dot{\omega}e \end{pmatrix} \qquad (2)$$

Figure 8:
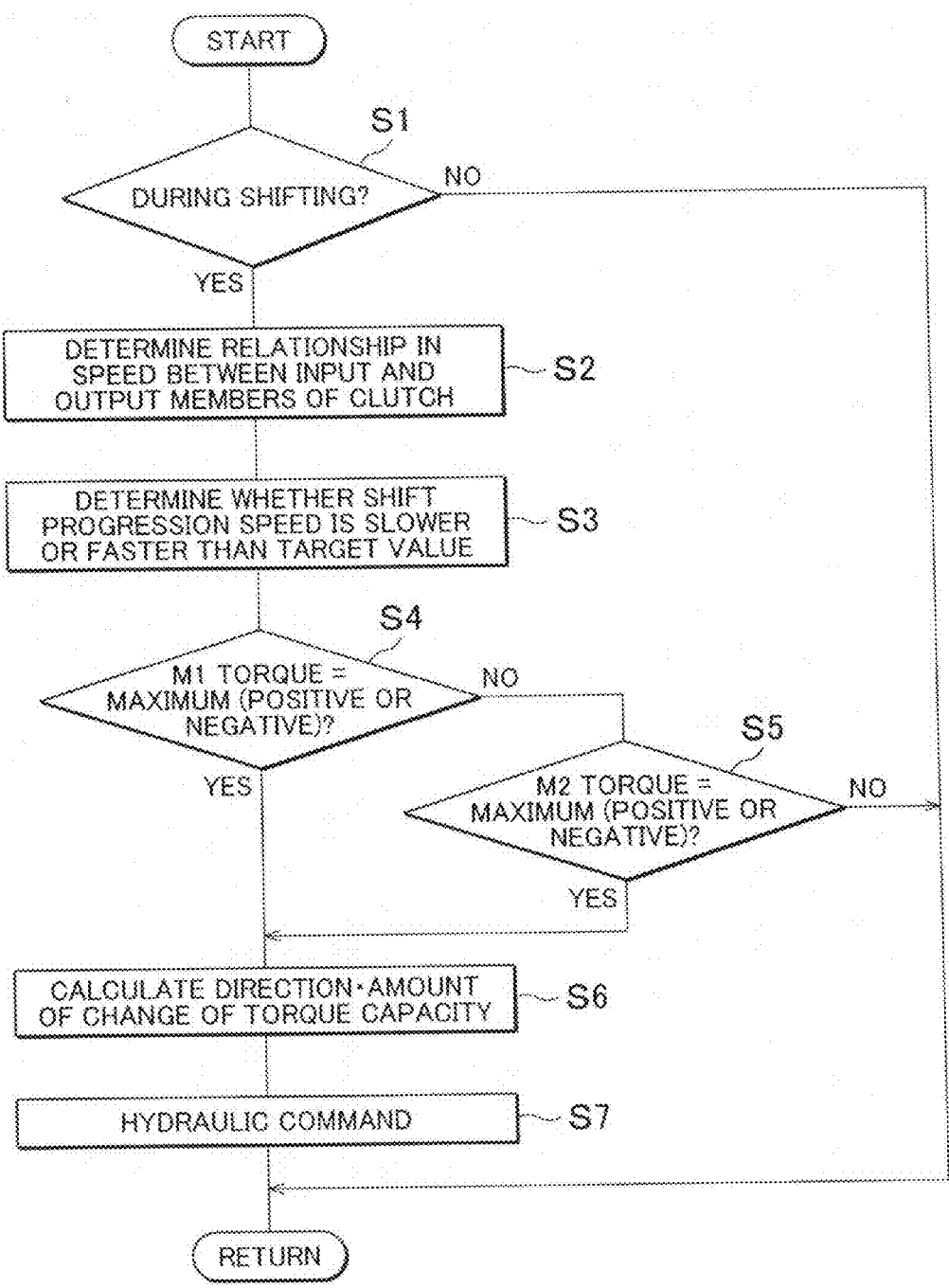
FIG. 8 is a flowchart illustrating a principal part of control operation of the electronic control unit of FIG. 4.

FIG. 8 is a flowchart explaining a principal part of control operation of the electronic control unit 80, and the routine of FIG. 8 is repeatedly executed in a control cycle of several milliseconds to several tens of milliseconds, for example. In step S1 of FIG. 8, it is determined whether the automatic transmission portion 20 is in the middle of clutch-to-clutch shifting. If a negative decision (NO) is made in step S1, this routine ends. If an affirmative decision (YES) is made, it is determined in step S2 corresponding to the input and output rotational speed determining unit 86 whether, during clutch-to-clutch shifting performed by the stepwise shift control means 82, one of a pair of engaging devices involved with the clutch-to-clutch shifting, as a predetermined object to be controlled, namely, the release-side engaging device or the apply-side engaging device, is slipping in the clutch-to-clutch shift period, for example, based on a difference in the rotational speed between the input member and output member of the engaging device. This condition is indicated at time t2 in FIG. 9 through FIG. 16.

Then, in step S2 corresponding to the clutch input and output rotational speed determining unit 86, it is determined whether the engaging device to be controlled by correcting the hydraulic pressure is the release-side engaging device or the apply-side engaging device, based on which direction in which rotation of the input member of the engaging device that is slipping changes relative to that of the output member. Further, in step S3 corresponding to the target•actual input shaft speed change rate determining unit 88, it is determined whether the progression of shifting is faster or slower than the target shift progression speed, based on a difference between the actual rate of change d$\omega$m2/dt (rad/sec2) of the rotational speed $\omega$m2 (rad/sec) of the second motor M2 or the transmitting member 18, or the input shaft speed of the automatic transmission portion 20, which change occurs due to slip of the engaging device in the inertia phase within the clutch-to-clutch shift period, and the preset target input shaft speed change rate d$\omega$m2*/dt (rad/sec2).

Subsequently, steps S4-S6 corresponding to the clutch torque capacity changing unit 92 are executed. In step S4, it is determined whether the output torque of the first motor M1 reaches and is limited by the positive or negative maximum torque. If a negative decision (NO) is made in step S4, it is determined in step S5 whether the output torque of the second motor M2 reaches and is limited by the positive or negative maximum torque. If a negative decision (NO) is made in step S5, the routine of FIG. 8 ends. If an affirmative decision (YES) is made in step S4 or step S5, step S6 is executed to determine the direction in which the torque capacity is changed, from the relationships shown in FIG. 7, and calculate the amount of change from according to Eq. (1) above. Then, in step S7 corresponding to the clutch torque capacity control unit 90, the direction and amount of change of the torque capacity determined in step S6 are output, and the torque capacity Tc of the engaging device that is slipping is corrected so as to change the input shaft speed $\omega$m2 of the automatic transmission portion 20 in the inertia phase during clutch-to-clutch shifting.

As a result, in the "Hydraulic Pressure" section of the time charts of FIG. 9 through FIG. 16, the torque capacity of the engaging device that is slipping is changed from values indicated by a broken line to values indicated by a solid line so that the input shaft speed of the automatic transmission portion 20 is changed in the inertia phase during clutch-to-clutch shifting; therefore, the rotational speed Nm2 of the second motor M2 is changed from values indicated by a broken line to values indicated by a solid line. In this manner, the slip time of the engaging device is shortened in Control Example 1 of FIG. 9, Control Example 3 of FIG. 11, Control Example 5 of FIG. 13, and Control Example 7 of FIG. 15, so that the durability and shift response of the engaging device are enhanced. Also, the slip time of the engaging device is prolonged in Control Example 2 of FIG. 10, Control Example 4 of FIG. 12, Control Example 6 of FIG. 14, and Control Example 8 of FIG. 16, so that shift shock of the vehicle is alleviated.

Figure 9:
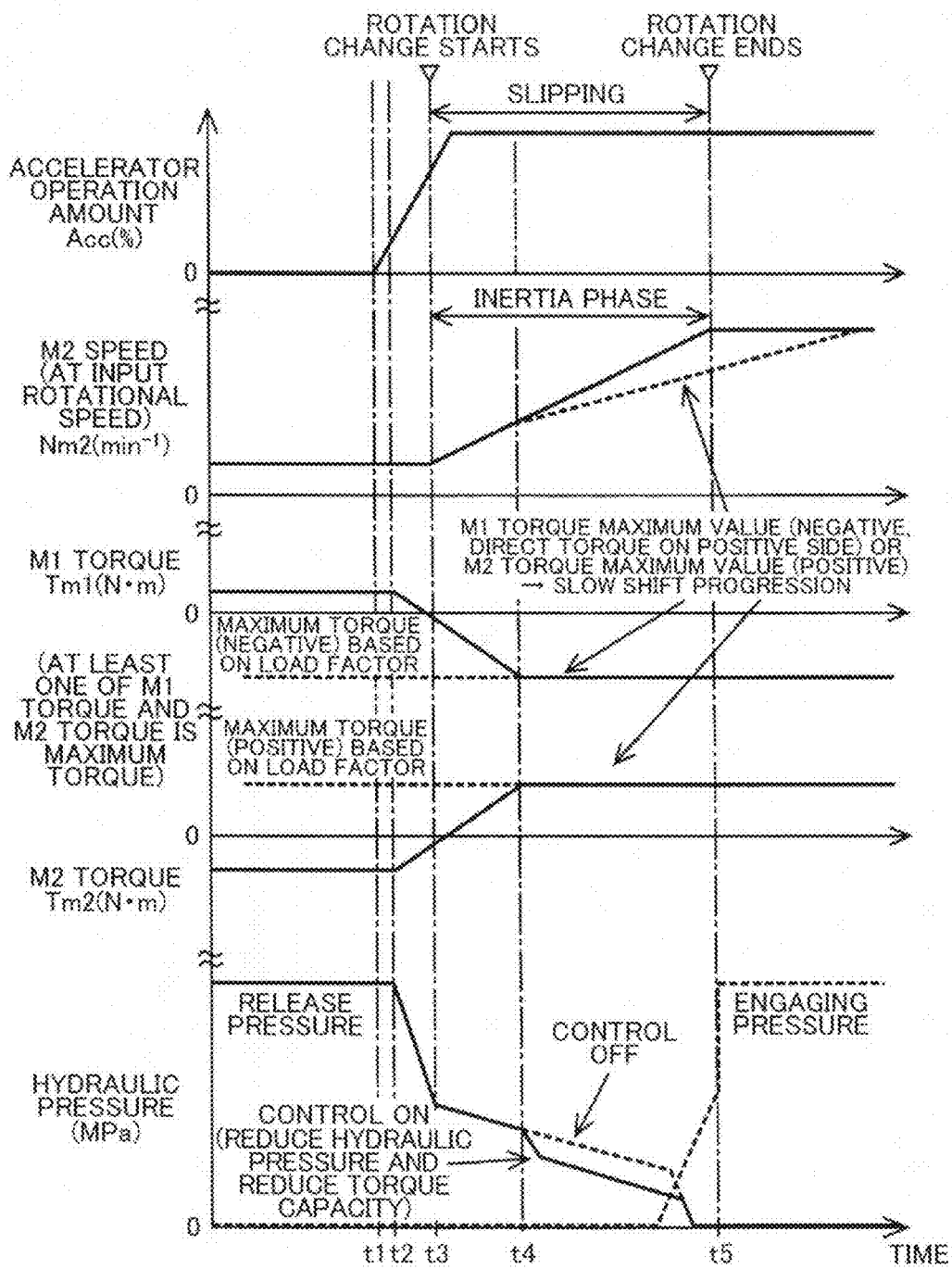
FIG. 9 is a time chart explaining operation of Control Example 1 of FIG. 7.
Figure 10:
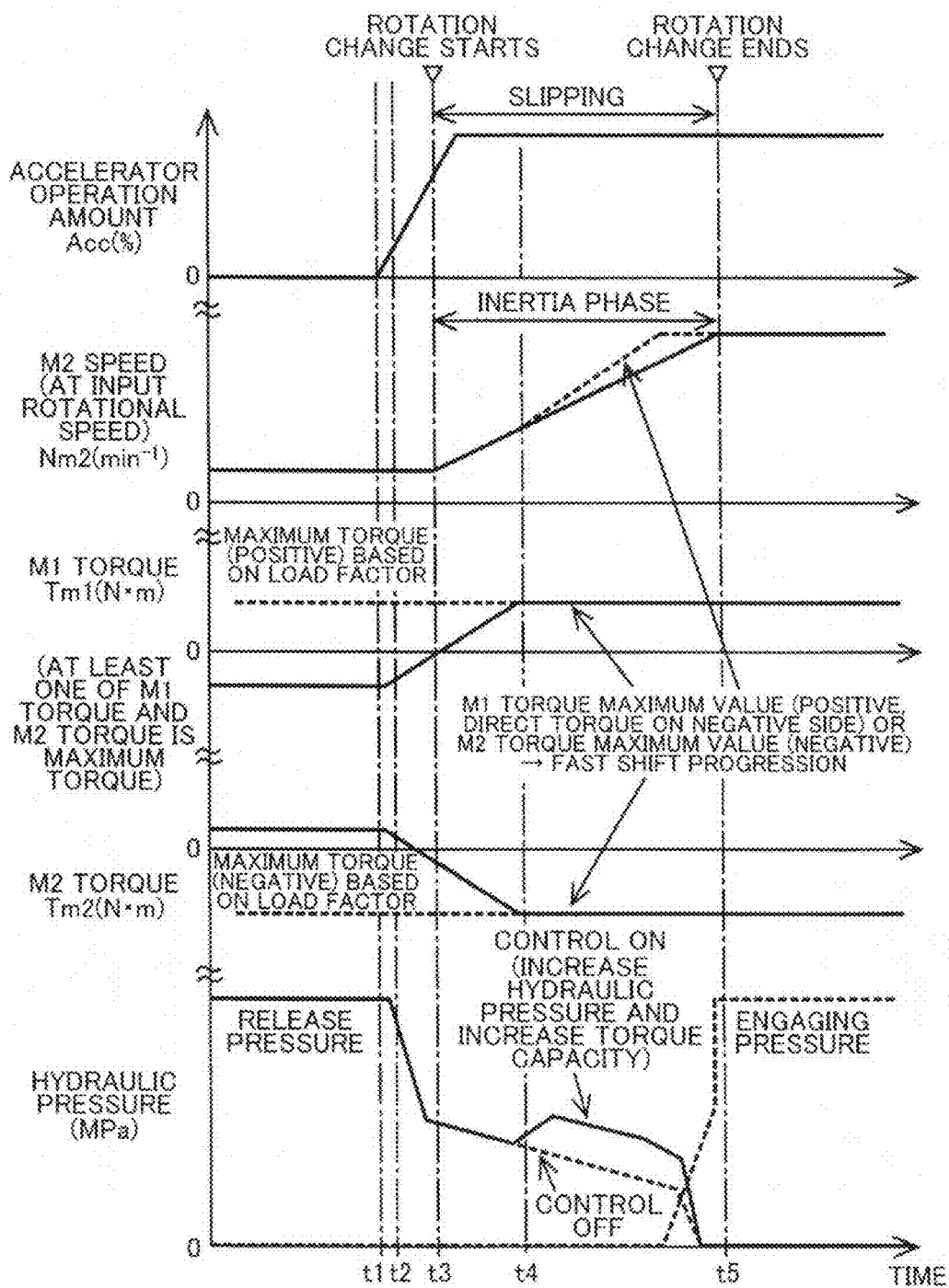
FIG. 10 is a time chart explaining operation of Control Example 2 of FIG. 7.
Figure 11:
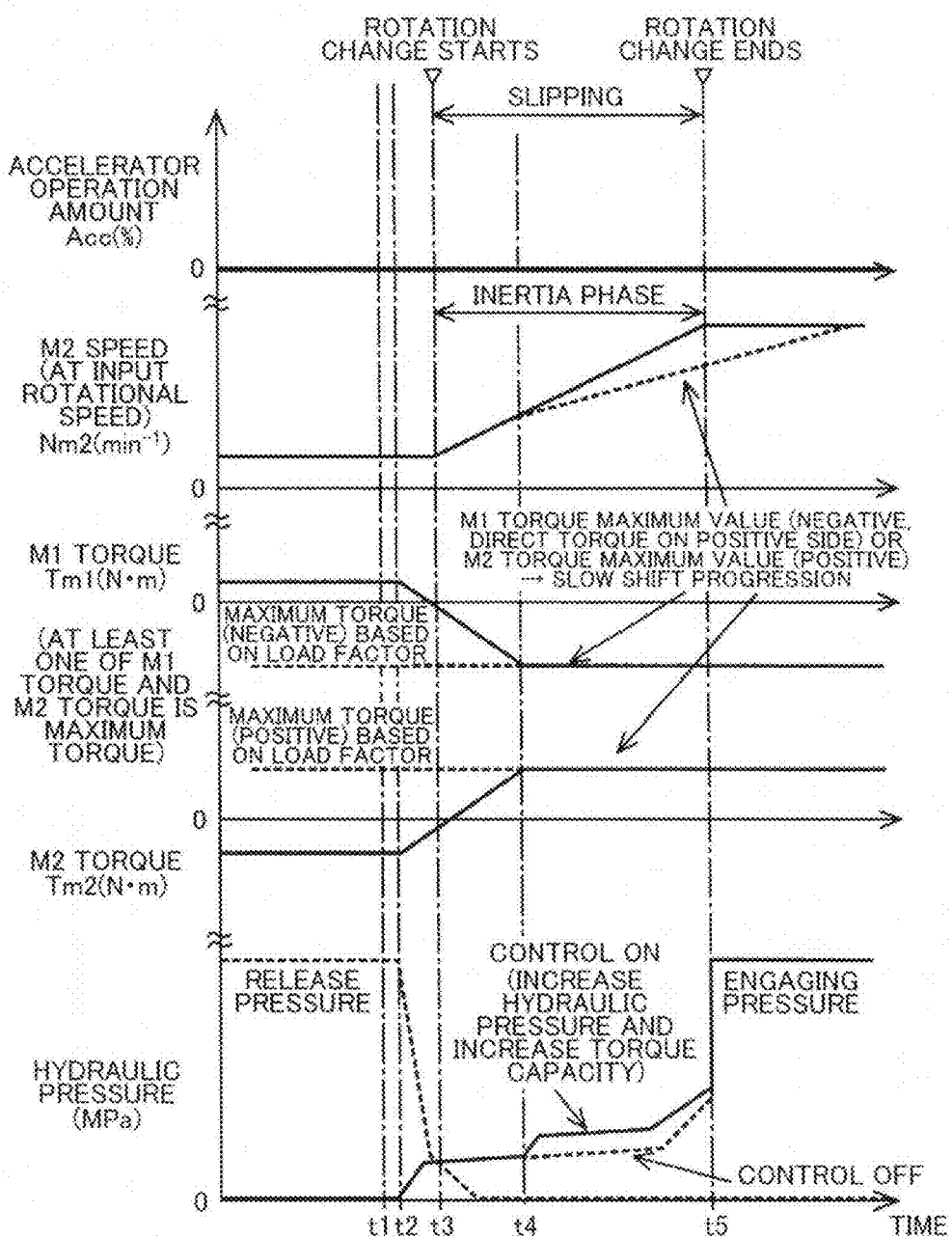
FIG. 11 is a time chart explaining operation of Control Example 3 of FIG. 7.
Figure 12:
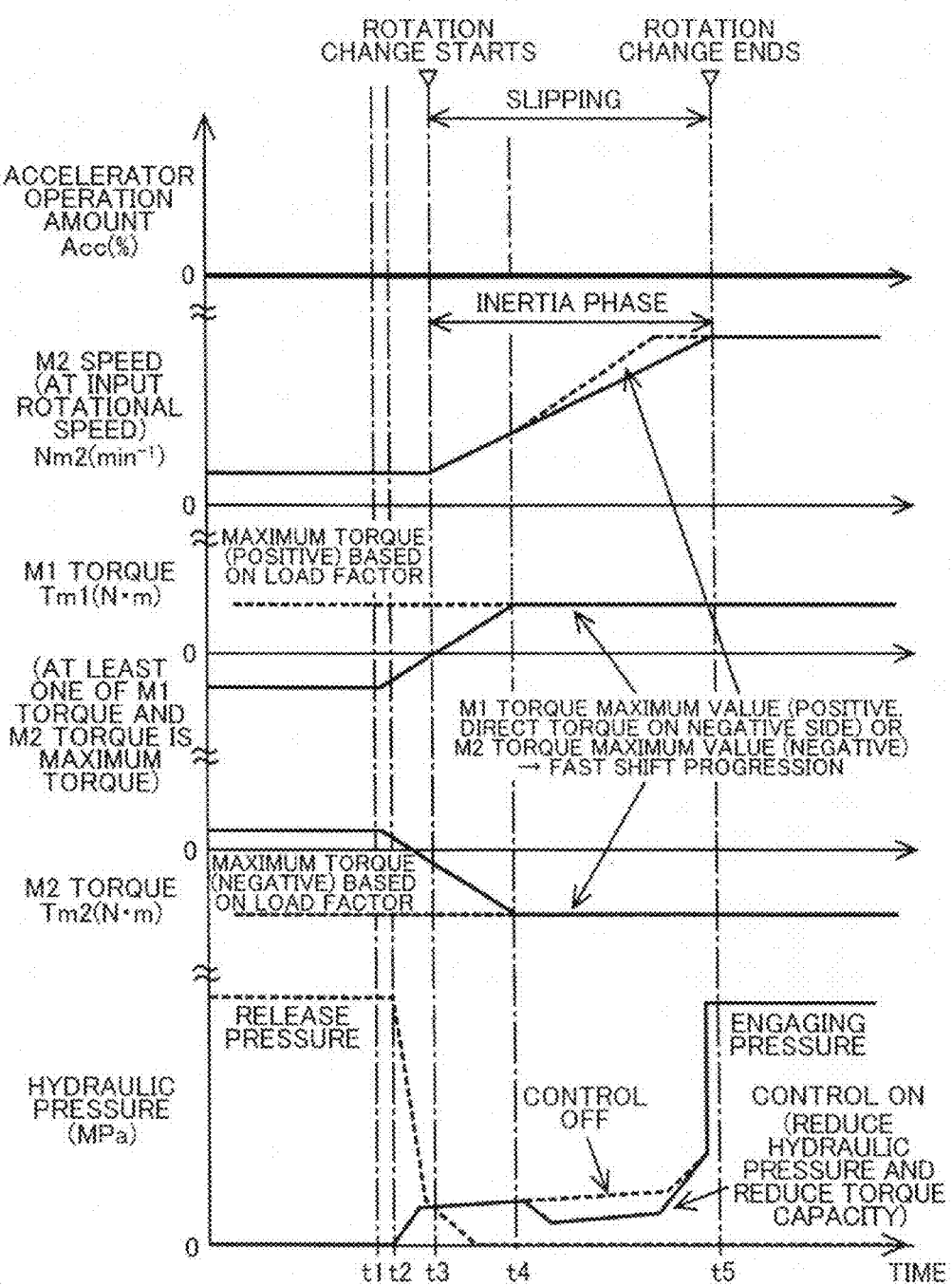
FIG. 12 is a time chart explaining operation of Control Example 4 of FIG. 7.
Figure 13:
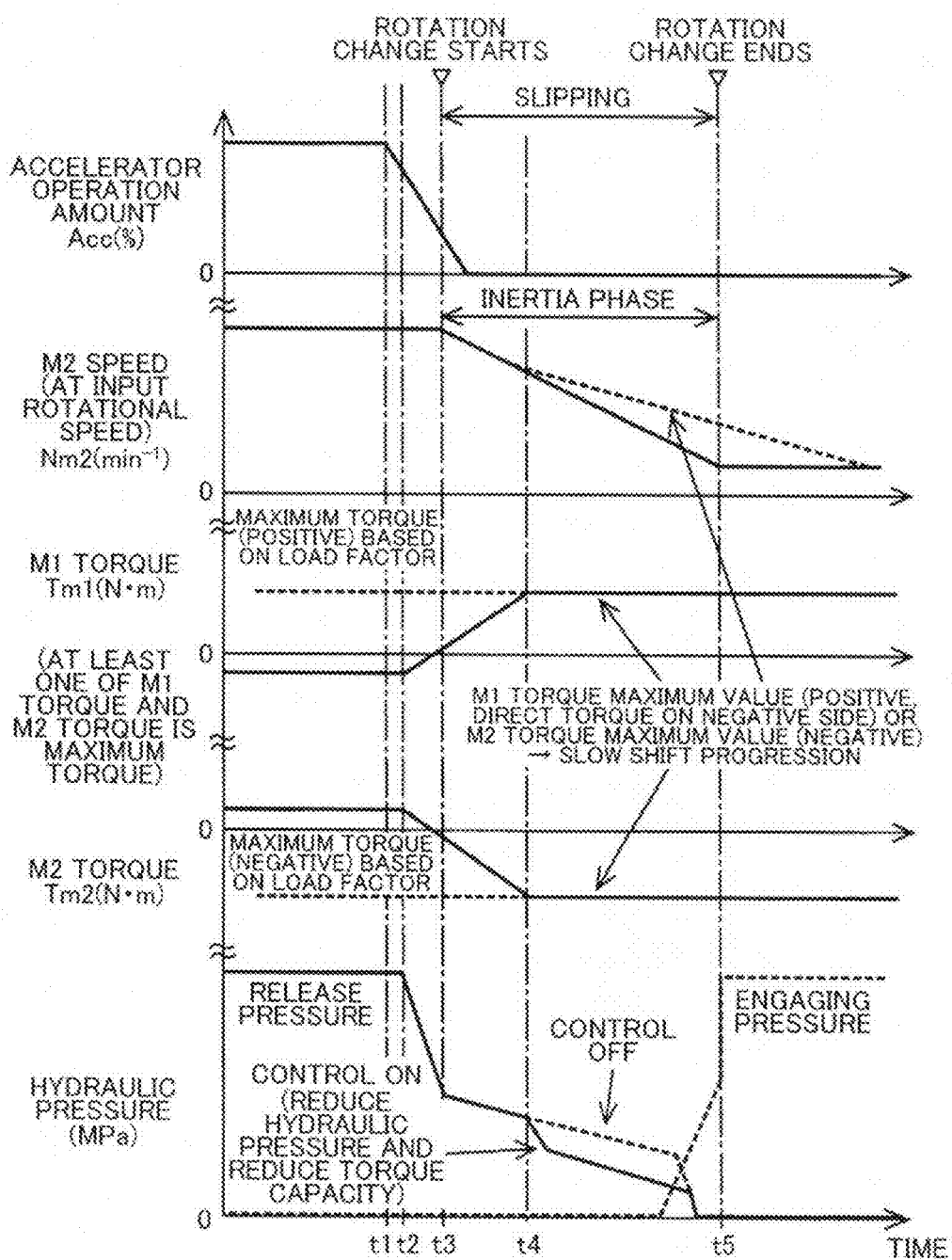
FIG. 13 is a time chart explaining operation of Control Example 5 of FIG. 7.
Figure 14:
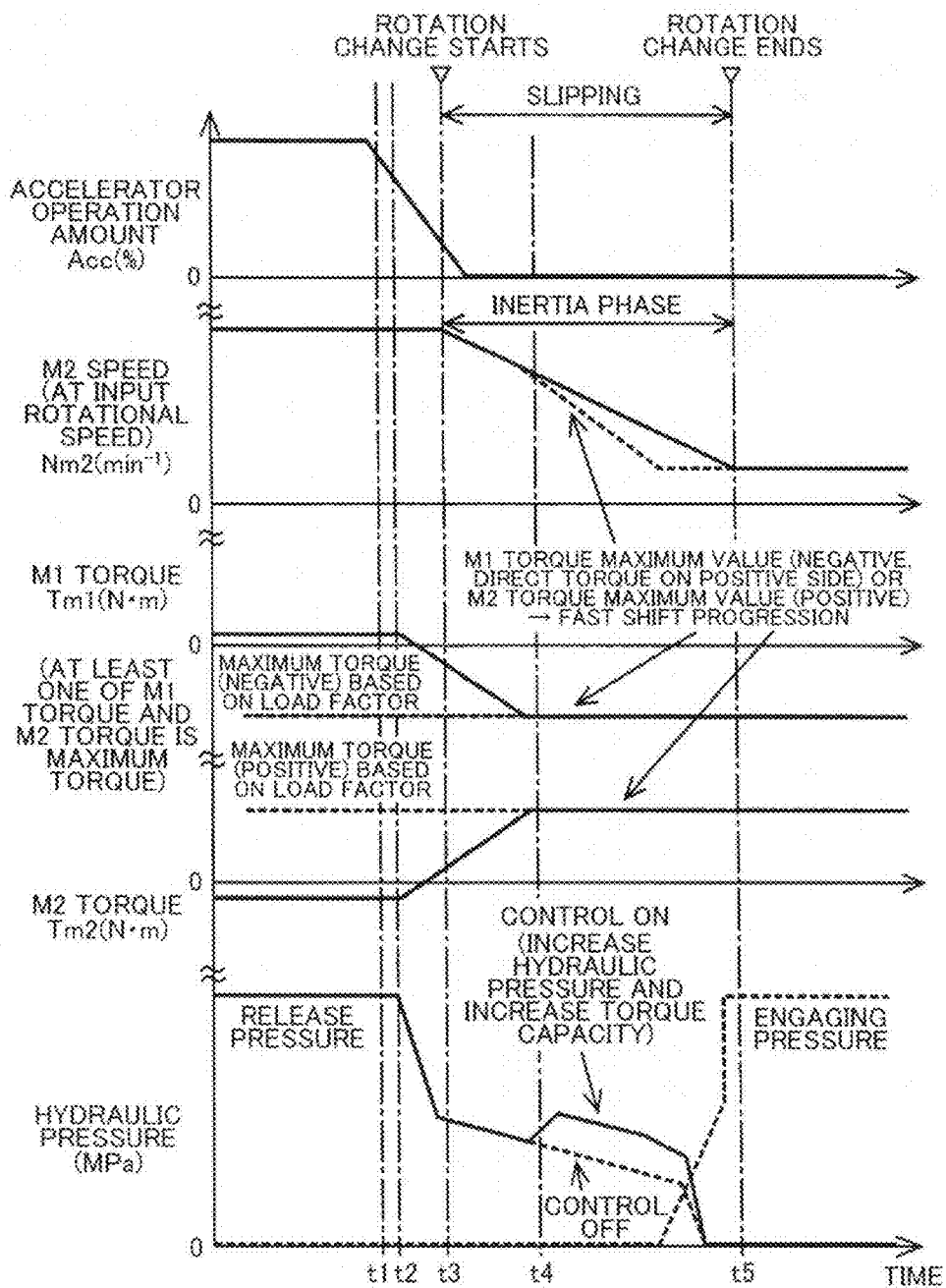
FIG. 14 is a time chart explaining operation of Control Example 6 of FIG. 7.
Figure 15:
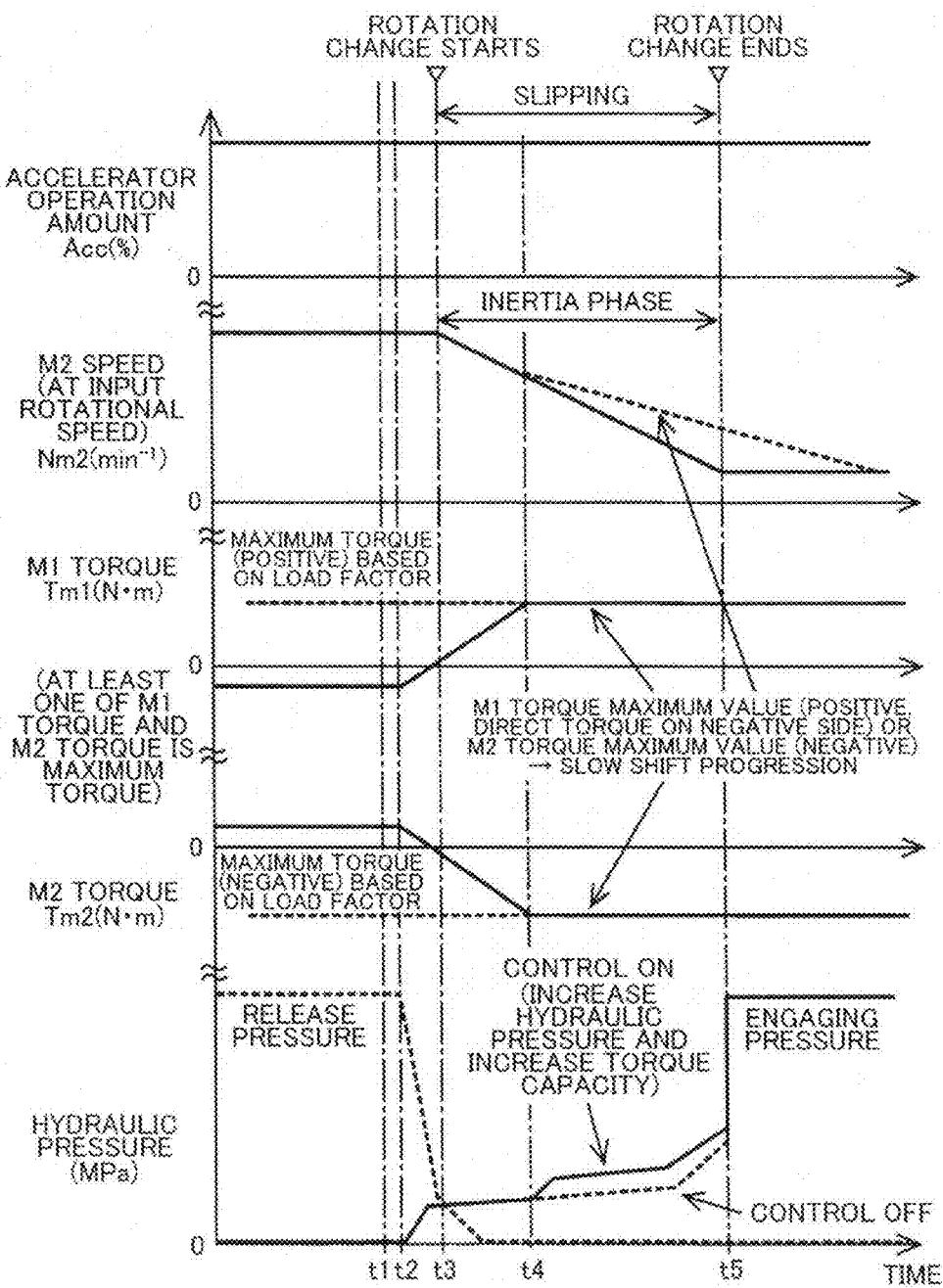
FIG. 15 is a time chart explaining operation of Control Example 7 of FIG. 7.
Figure 16:
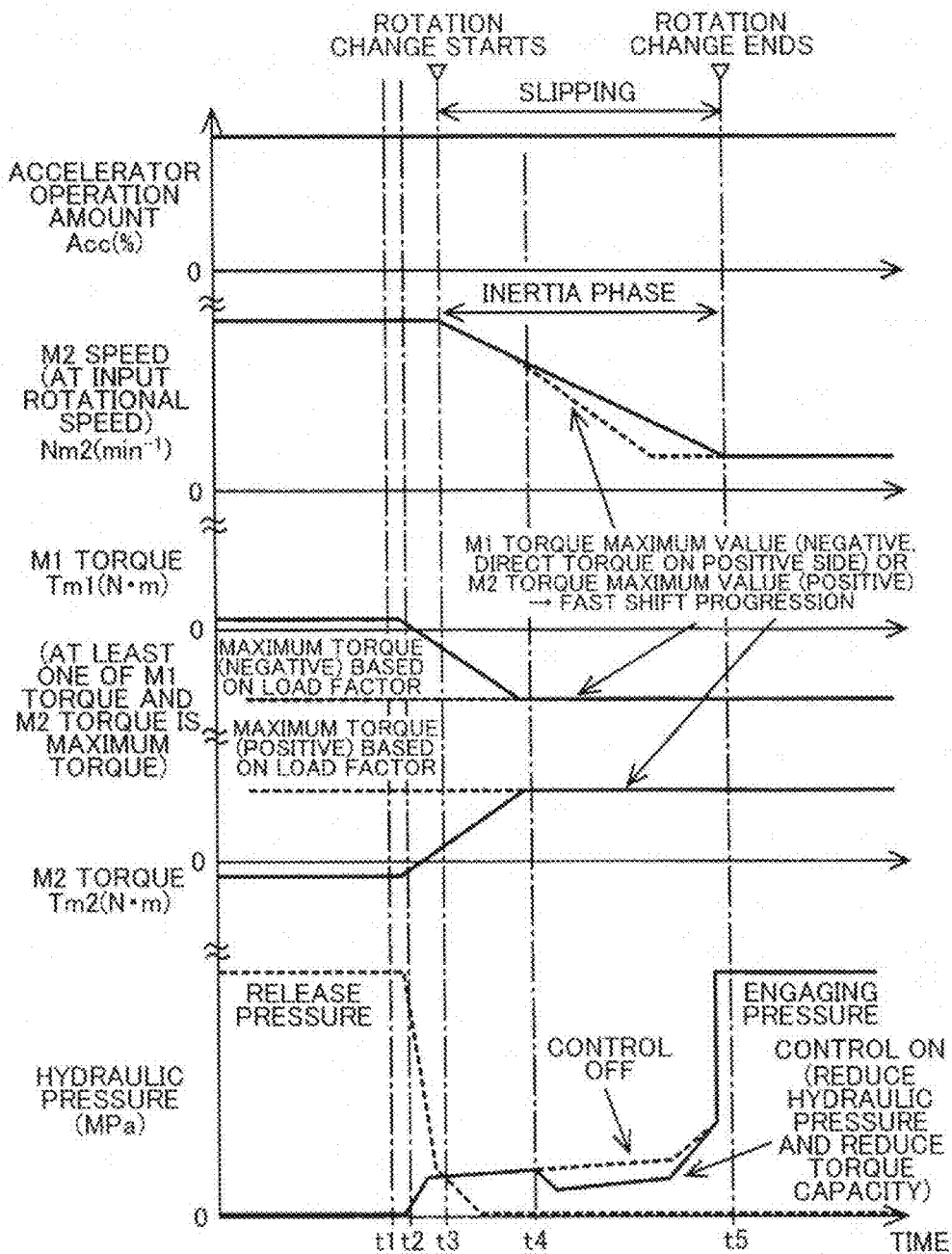
FIG. 16 is a time chart explaining operation of Control Example 8 of FIG. 7.

In Control Example 1 as shown in the time chart of FIG. 9, the release-side engaging device involved with a downshift is a control object of which the torque capacity is corrected, and the torque Tm1 of the first motor M1 is limited by the negative-side maximum torque, or the torque Tm2 of the second motor M2 is limited by the positive-side maximum torque, whereby the shift progression speed is slow; therefore, the torque capacity of the release-side engaging device is reduced. In Control Example 2 as shown in the time chart of FIG. 10, the release-side engaging device involved with a downshift is a control object of which the torque capacity is corrected, and the torque Tm1 of the first motor M1 is limited by the positive-side maximum torque, or the torque Tm2 of the second motor M2 is limited by the negative-side maximum toque, whereby the shift progression speed is fast; therefore, the torque capacity of the release-side engaging device is increased. In Control Example 3 as shown in the time chart of FIG. 11, the apply-side engaging device involved with a downshift is a control object of which the torque capacity is corrected, and the torque Tm1 of the first motor M1 is limited by the negative-side maximum torque, or the torque Tm2 of the second motor M2 is limited by the positive-side maximum torque, whereby the shift progression speed is slow; therefore, the torque capacity of the apply-side engaging device is increased. In Control Example 4 as shown in the time chart of FIG. 12, the apply-side engaging device involved with a downshift is a control object of which the torque capacity is corrected, and the torque Tm1 of the first motor M1 is limited by the positive-side maximum torque, or the torque Tm2 of the second motor M2 is limited by the negative-side maximum torque, whereby the shift progression speed is fast; therefore, the torque capacity of the apply-side engaging device is reduced. In Control Example 5 as shown in the time chart of FIG. 13, the release-side engaging device involved with an upshift is a control object of which the torque capacity is corrected, and the torque Tm1 of the first motor M1 is limited by the positive-side maximum torque, or the torque Tm2 of the second motor M2 is limited by the negative-side maximum torque, whereby the shift progression speed is slow; therefore, the torque capacity of the release-side engaging device is reduced. In Control Example 6 as shown in the time chart of FIG. 14, the release-side engaging device involved with an upshift is a control object of which the torque capacity is corrected, and the torque Tm1 of the first motor M1 is limited by the negative-side maximum torque, or the torque Tm2 of the second motor M2 is limited by the positive-side maximum torque, whereby the shift progression speed is fast; therefore, the torque capacity of the release-side engaging device is increased. In Control Example 7 as shown in the time chart of FIG. 15, the apply-side engaging device involved with an upshift is a control object of which the torque capacity is corrected, and the torque Tm1 of the first motor M1 is limited by the positive-side maximum torque, or the torque Tm2 of the second motor M2 is limited by the negative-side maximum torque, whereby the shift progression speed is slow; therefore, the torque capacity of the apply-side engaging device is increased. In Control Example 8 as shown in the time chart of FIG. 16, the apply-side engaging device involved with an upshift is a control object of which the torque capacity is corrected, and the torque Tm1 of the first motor M1 is limited by the negative-side maximum torque, or the torque Tm2 of the second motor M2 is limited by the positive-side maximum torque, whereby the shift progression speed is fast; therefore, the toque capacity of the apply-side engaging device is reduced. In FIG. 9 through FIG. 16, time t1 denotes a shift determination (command) point, time t2 denotes a shift start point, time t3 denotes an inertia-phase start point, time t4 denotes a torque capacity change (correction) start point, and time t5 denotes a shift end point.

As described above, according to the electronic control unit 80 of this embodiment, when an engaging device involved with clutch-to-clutch shifting of the automatic transmission portion 20 slips while at least one of the first motor M1 and the second motor M2 is operated with the predetermined maximum torque of the positive side or negative side, the torque capacity of the engaging device is changed, so that the slipping condition of the engaging device is controlled. Thus, the slipping condition of the engaging device can be made close to a predetermined target slipping condition (target input shaft speed change rate $d\omega m2^*/dt$ (rad/sec2)), so that the durability of the engaging device is less likely to be impaired, and engagement shock of the engaging device, namely, shift shock of the vehicle, is favorably suppressed.

Also, according to the electronic control unit 80 of this embodiment, the torque capacity (changed value) Tct of the engaging device is calculated from the pre-stored relationship derived from the motion equations, i.e., Eq. (1), based on the maximum torque of the actual first motor M1 or second motor M2 and the target input shaft speed change rate $d\omega m2^*/dt$. Therefore, the slipping condition of the engaging device involved with clutch-to-clutch shifting is favorably controlled, so that the predetermined target input shaft speed change rate $d\omega m2^*/dt$ (rad/sec2) can be obtained, namely, the target slipping condition can be obtained.

Also, according to the electronic control unit 80 of this embodiment, when the output torque of the second motor M2 is limited by the positive-side maximum torque, and the input rotational speed of the engaging device that slips in the inertia phase of clutch-to-clutch shifting (or the rotational speed of the second rotary machine directly coupled to the engaging device) is lower than the target rotational speed, slip control of the engaging device is performed. In the slip control, at least one of the following corrections is performed; namely, the torque capacity of the engaging device whose input rotational speed is lower than the output rotational speed thereof is corrected to be increased, and the torque capacity of the engaging device whose output rotational speed is lower than the input rotational speed thereof is corrected to be reduced. Therefore, in either case, slip control is performed on the engaging device so as to increase the rate of increase of the input rotational speed of the engaging device (or the rotational speed of the second rotary machine directly coupled to the engaging device), and achieve the target input shaft speed change rate $d\omega m2^*/dt$.

Also, according to the electronic control unit 80 of this embodiment, when the output torque of the second motor M2 is limited by the positive-side maximum torque, and the input rotational speed of the engaging device that slips in the inertia phase of clutch-to-clutch shifting is lower than the output rotational speed, slip control of the engaging device is performed. In the slip control, when the input shaft speed change rate $d\omega m2/dt$ of the automatic transmission 20 is lower than the target input shaft speed change rate $d\omega m2^*/dt$, the rate of increase of the input rotational speed is low, and therefore, the torque capacity of the engaging device is corrected to be increased. When the input shaft speed change rate $d\omega m2/dt$ of the automatic transmission 20 is higher than the target input shaft speed change rate $d\omega m2^*/dt$, the rate of increase of the input rotational speed is high, and therefore, the torque capacity of the engaging device is corrected to be reduced. In this manner, slip control is performed on the engaging device so as to achieve the predetermined target input shaft speed change rate $d\omega m2^*/dt$, namely, to achieve the target slipping condition.

Figure 17:
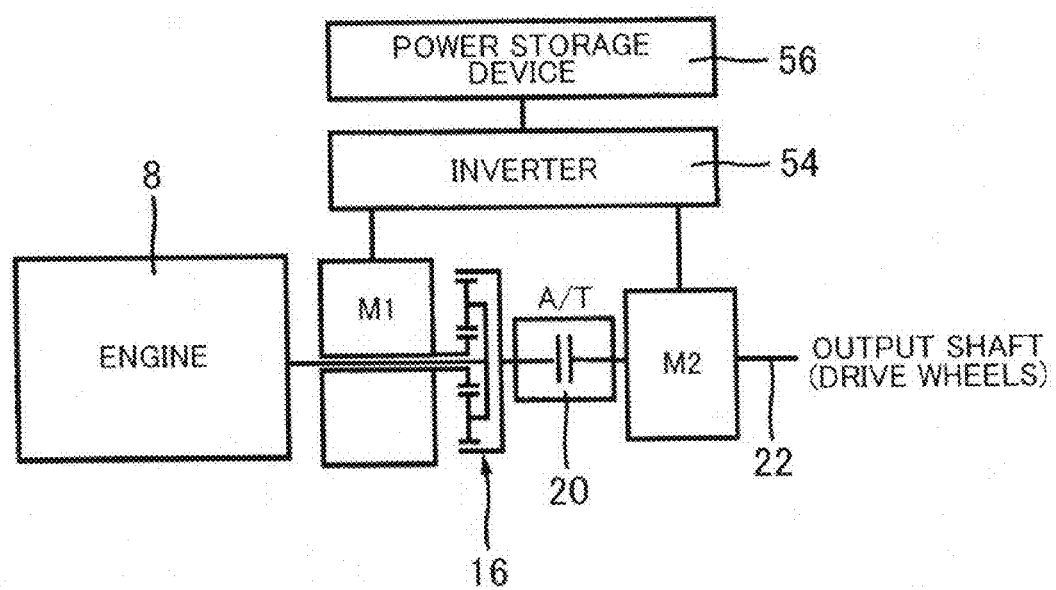
FIG. 17 is a skeleton diagram illustrating the construction of a power transmission mechanism of a hybrid vehicle according to another embodiment of the invention.

While the second motor M2 of the above-described embodiment is operatively coupled to the transmitting member 18 corresponding to the input shaft of the automatic transmission portion 20, the second motor M2 may be coupled to the output shaft 22 of the automatic transmission portion 20, as shown in FIG. 17. With this arrangement, too, the same or similar effects as those of the above-described embodiment are provided.

While the embodiments of the invention have been described in detail with reference to the drawings, the invention may be embodied in other forms.

For example, according to this invention, the predetermined maximum torque of the first motor M1 or the second motor M2 may be the rated torque limited based on the specifications of the first motor or the second motor, or may be the maximum limit torque limited based on the load factor, or heat requirement, of the first motor or the second motor.

While the automatic transmission portion 20 in the above-described shift mechanism 10 consists of three planetary gear sets 26, 28, 30, the automatic transmission portion 20 may be selected from various types of planetary gear type multi-speed transmissions, such as two-speed automatic transmission having a low-speed position L and a high-speed position H. As the frictional engaging devices provided in the automatic transmission portion 20, hydraulic friction devices, such as single disc clutches and brakes, or belt-type brakes, as well as multiple disc clutches engaged by hydraulic actuators, may be widely used. A clutch may be provided in place of the automatic transmission portion 20, or another type of transmission, such as a parallel-shaft normally meshing type transmission or a continuously variable transmission, may be used provided that it has an engaging device for shifting, which corresponds to the clutch.

While the above-described differential mechanism 16 is the single pinion type planetary gear set in which the carrier receives input power, it may be of a type in which the sun gear receives input power, or a type in which the ring gear receives input power, or may be of a double pinion type.

While the above-described shift mechanism 10 is vertically mounted on a vehicle, such as a FR (front-engine, rear-drive) vehicle, such that the axis of the shift mechanism 10 extends in the longitudinal direction of the vehicle, the shift mechanism 10 may be transversely mounted on a vehicle, such as a FF (front-engine, front-drive) vehicle, such that the axis of the shift mechanism 10 extends in the width direction of the vehicle.

The engine 8 and the differential mechanism 16 are only required to be operatively coupled to each other. While a pulsation absorbing damper (vibration damping device), a lock-up clutch, a lock-up clutch with a damper, a hydraulic power transmission device, or the like, may be interposed between the engine 8 and the differential mechanism 16, for example, the engine 8 and the differential mechanism 16 may be normally coupled to each other.

As the above-described engine 8, an internal combustion engine, such as a gasoline engine or a diesel engine, may be widely used. Further, an electric motor, or the like, may be used as an auxiliary source of driving force for running the vehicle, in addition to the engine.

While the differential mechanism 16 has a single planetary gear in the above-described embodiment, it may have two planetary gears. Also, the differential mechanism 16 may be a differential gear device having a pinion rotated/driven by the engine 8, and a pair of bevel gears that mesh with the pinion and are operatively coupled to the first motor M1 and the transmitting member 18, for example.

It is to be understood that the above-described embodiments are merely exemplary, and the invention may be embodied with various changes, modifications, or improvements, based on the knowledge of those skilled in the art.

What is claimed is:

1. A control system for a hybrid vehicle, the control system comprising:
    an electric steplessly speed changing unit that includes a differential mechanism including a first rotary element to which an engine is coupled, a second rotary element to which a first rotary machine is coupled, and a third rotary element that is an output rotary member of the differential mechanism to which a second rotary machine is coupled, differential operation of the electric steplessly speed changing unit being controlled by a controlling operation of the first rotary machine;
    an engaging device provided in a power transmission path between the third rotary element and drive wheels; and
    an electronic control unit configured to control a slip amount of the engaging device by changing a torque capacity of the engaging device, when at least one of the first rotary machine and the second rotary machine is operated with a predetermined maximum torque that is positive or negative.

2. The control system according to claim 1, wherein
the predetermined maximum torque of the first rotary machine is a maximum limit torque that is limited by heat of the first rotary machine,
the predetermined maximum torque of the second rotary machine is a maximum limit torque that is limited by heat of the second rotary machine.

3. The control system according to claim 1, wherein
the electronic control unit changes the torque capacity of the engaging device from a pre-stored relationship derived from an equation of motion, based on the maximum torque of the first rotary machine or the second rotary machine, and a predetermined target rate of change of an input shaft speed of the engaging device.

4. The control system according to claim 1, further comprising
    an automatic speed changing unit provided between the differential mechanism and the drive wheels, and including the engaging device for switching gear positions of the automatic speed changing unit, wherein
    in slip amount control of the engaging device performed when output torque of the second rotary machine is limited by the maximum torque that is positive and when a rate of change of a rotational speed of an input shaft of the automatic speed changing unit is lower than a predetermined target rate of change, the electronic control unit performs at least one of a correction to increase the torque capacity of the engaging device whose input rotational speed is lower than an output rotational speed of the engaging device, and a correction to reduce the torque capacity of the engaging device whose output rotational speed is lower than the input rotational speed of the engaging device.

5. The control system according to claim 1, further comprising:
    an automatic speed changing unit provided between the differential mechanism and the drive wheels, and including the engaging device for switching gear positions of the automatic speed changing unit, wherein
    in slip amount control of the engaging device performed when output torque of the second rotary machine is limited by the maximum torque that is positive and when an input rotational speed of the engaging device is lower than an output rotational speed of the engaging device, the electronic control unit increases the torque capacity of the engaging device when a rate of change of a rotational speed of an input shaft of the automatic speed changing unit is lower than a predetermined target rate of change, and reduces the torque capacity of the engaging device when the rate of change of the rotational speed of the input shaft of the automatic speed changing unit is higher than the target rate of change.

6. A control device for a hybrid vehicle including an electric steplessly speed changing unit and an engaging device, the electric steplessly speed changing unit including a differential mechanism including a first rotary element to which an engine is coupled, a second rotary element to which a first rotary machine is coupled, and a third rotary element that is an output rotary member of the differential mechanism to which a second rotary machine is coupled, and the engaging device being provided in a power transmission path between the third rotary element and drive wheels, the control device comprising:
    an electronic control unit configured to control an output torque of the first rotary machine and an output torque of the second rotary machine, configured to control a differential operation of the electric steplessly speed changing unit by controlling the output torque of the first rotary machine, and configured to control a slip amount of the engaging device by changing a torque capacity of the engaging device, when at least one of the first rotary machine and the second rotary machine is operated with a predetermined maximum torque that is positive or negative.

7. A control method for a hybrid vehicle including an electric steplessly speed changing unit, an engaging device, and an electronic control unit,
    the electric steplessly speed changing unit including a differential mechanism including a first rotary element to which an engine is coupled, a second rotary element to which a first rotary machine is coupled, and a third rotary element that is an output rotary member of the differential mechanism to which a second rotary machine is coupled,
    differential operation of the electric steplessly speed changing unit being controlled by controlling operation of the first rotary machine, and
    the engaging device being provided in a power transmission path between the third rotary element and drive wheels,
    the control method comprising:
    controlling a slip amount of the engaging device by changing a torque capacity of the engaging device by the electronic control unit, when at least one of the first rotary machine and the second rotary machine is operated with a predetermined maximum torque that is positive or negative.

* * * * *